(12) United States Patent
Hafeez

(10) Patent No.: US 12,526,642 B2
(45) Date of Patent: Jan. 13, 2026

(54) DATA DRIVEN SPECTRUM SHARING

(71) Applicant: Charter Communications Operating, LLC, St. Louis, MO (US)

(72) Inventor: Abdulrauf Hafeez, Cary, NC (US)

(73) Assignee: Charter Communications Operating, LLC, St. Louis, MO (US)

( * ) Notice: Subject to any disclaimer, the term of this patent is extended or adjusted under 35 U.S.C. 154(b) by 426 days.

(21) Appl. No.: 18/102,713

(22) Filed: Jan. 28, 2023

(65) Prior Publication Data

US 2024/0259822 A1     Aug. 1, 2024

(51) Int. Cl.
*H04W 16/14*     (2009.01)
*H04W 16/10*     (2009.01)
*H04W 72/0453*     (2023.01)
*H04W 72/541*     (2023.01)

(52) U.S. Cl.
CPC .......... *H04W 16/14* (2013.01); *H04W 16/10* (2013.01); *H04W 72/0453* (2013.01); *H04W 72/541* (2023.01)

(58) Field of Classification Search
CPC ................. H04W 16/10; H04W 16/14; H04W 72/0453; H04W 72/541
See application file for complete search history.

(56) References Cited

U.S. PATENT DOCUMENTS

| | | | | |
|---|---|---|---|---|
| 12,069,000 | B2* | 8/2024 | Kalenahalli | ........... H04L 5/0073 |
| 12,167,345 | B2* | 12/2024 | Hareuveni | .......... H04W 52/367 |
| 2019/0007909 | A1 | 1/2019 | Mueck et al. | |
| 2019/0223025 | A1 | 7/2019 | Kakinada et al. | |
| 2022/0256547 | A1* | 8/2022 | Macmullan | ....... H04W 72/0453 |
| 2023/0403690 | A1* | 12/2023 | Palayur | ............. H04W 72/0453 |
| 2024/0196225 | A1* | 6/2024 | Chiang | ................. H04W 52/16 |

OTHER PUBLICATIONS

Notification of Transmittal of the International Search Report and the Written Opinion of the International Searching Authority, International Search Report and Written Opinion of the International Searching Authority from PCT/US2024/013165, dated May 23, 2024, 14 pages.

* cited by examiner

*Primary Examiner* — Siu M Lee
(74) *Attorney, Agent, or Firm* — Straub & Straub; Michael P. Straub; Stephen T. Straub

(57) ABSTRACT

A data driven spectrum sharing approach is implemented amongst users of a shared band. A spectrum access controller (SAC) estimates interference and allocates spectrum in one or more bands to a plurality of spectrum user devices, e.g., macro base stations, small cell base stations, access points, etc. Different spectrum user devices in the plurality of spectrum user devices may correspond to different service providers, may use different technologies, may use different communications protocols, and/or may have different transmission power levels. The spectrum user devices send data feedback reports to the SAC including, e.g., received signals strength information, signal quality information, interference information, etc. The SAC uses the received data feedback reports to adjust, e.g., fine tune, interference limits and/or propagation model parameters. The SAC uses the adjusted, e.g., refined, interference limits and adjusted, e.g., refined, propagation models, to make more accurate decisions regarding spectrum reuse.

20 Claims, 10 Drawing Sheets

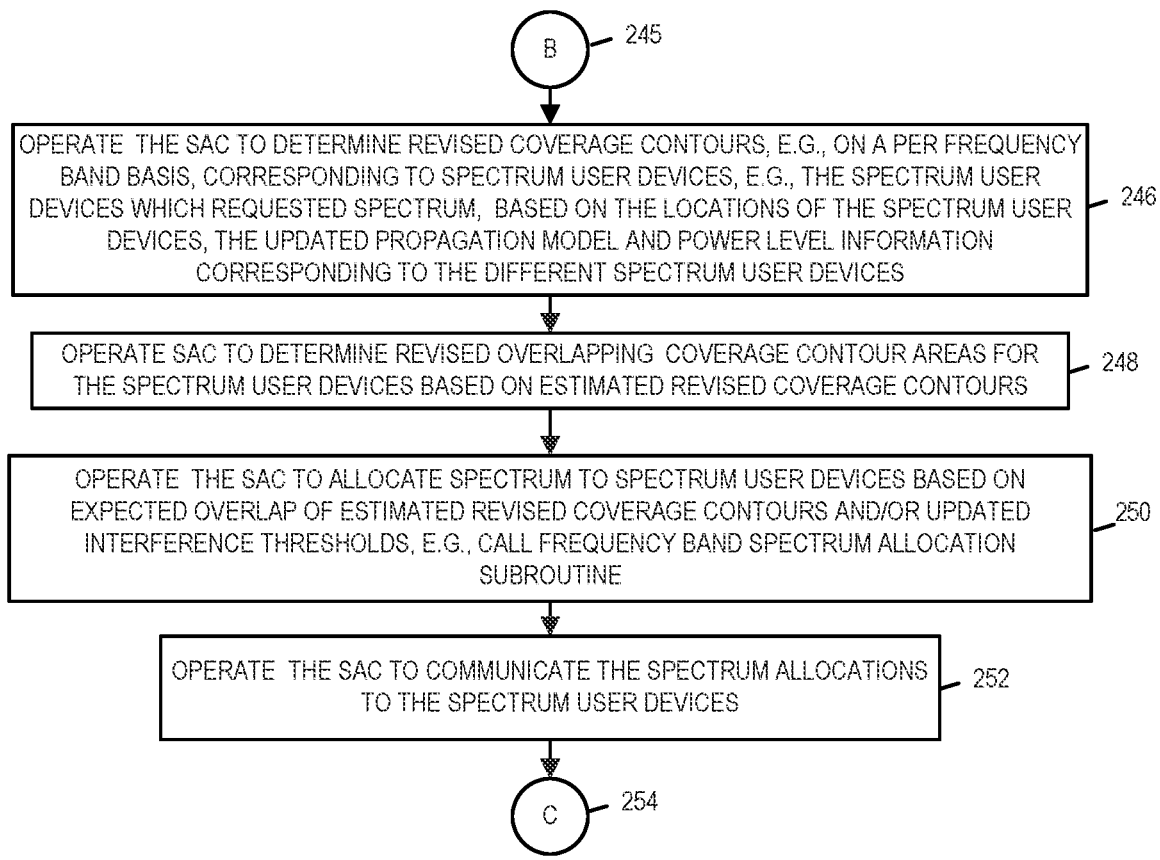

DATA DRIVEN SPECTRUM SHARING

FIELD

The present application relates to communications systems and more particularly to methods and apparatus for controlling spectrum allocation in a manner that can dynamically change based on feedback received from devices which use allocated spectrum.

BACKGROUND

Citizens Broadband Radio Service (CBRS) band spectrum is shared among three tiers of users: Tier 1 incumbents, Tier 2 priority access licensee (PAL) and Tier 3 general authorized access (GAA). A spectrum access system (SAS) enables spectrum sharing among users within the same tier and across the three tiers based on propagation modeling.

6 GHz band is shared between unlicensed users and incumbent fixed satellite service (FSS) receivers. An automatic frequency controller (AFC) controls access to various frequencies in the band based on propagation modeling.

Sharing among unlicensed users in 5 and 6 GHz bands is done by means of channel sensing, aka listen before talk (LBT).

Various problems with the above-described approaches of spectrum sharing will now be described. Channel sensing cannot be used reliably for sharing with incumbents. Channel sensing has only been proven to be effective in relatively high frequency bands. SAS/AFC based sharing has the following drawbacks. The use of conservative propagation models, which is generally the case, results in sparse spectrum use. On the other hand, the use of liberal propagation models may lead to interference to protected entities. Interference concerns amongst uses have to be reported and resolved manually.

Based on the above discussion there is a need for new methods and apparatus for spectrum sharing.

BRIEF DESCRIPTION OF THE FIGURES

FIG. 2C is a third part of a flowchart of an exemplary method of operating a communications system including a spectrum access controller in accordance with an exemplary embodiment.

FIG. 2 comprises the combination of FIG. 2A, FIG. 2B and FIG. 2C.

SUMMARY

Figure 1:
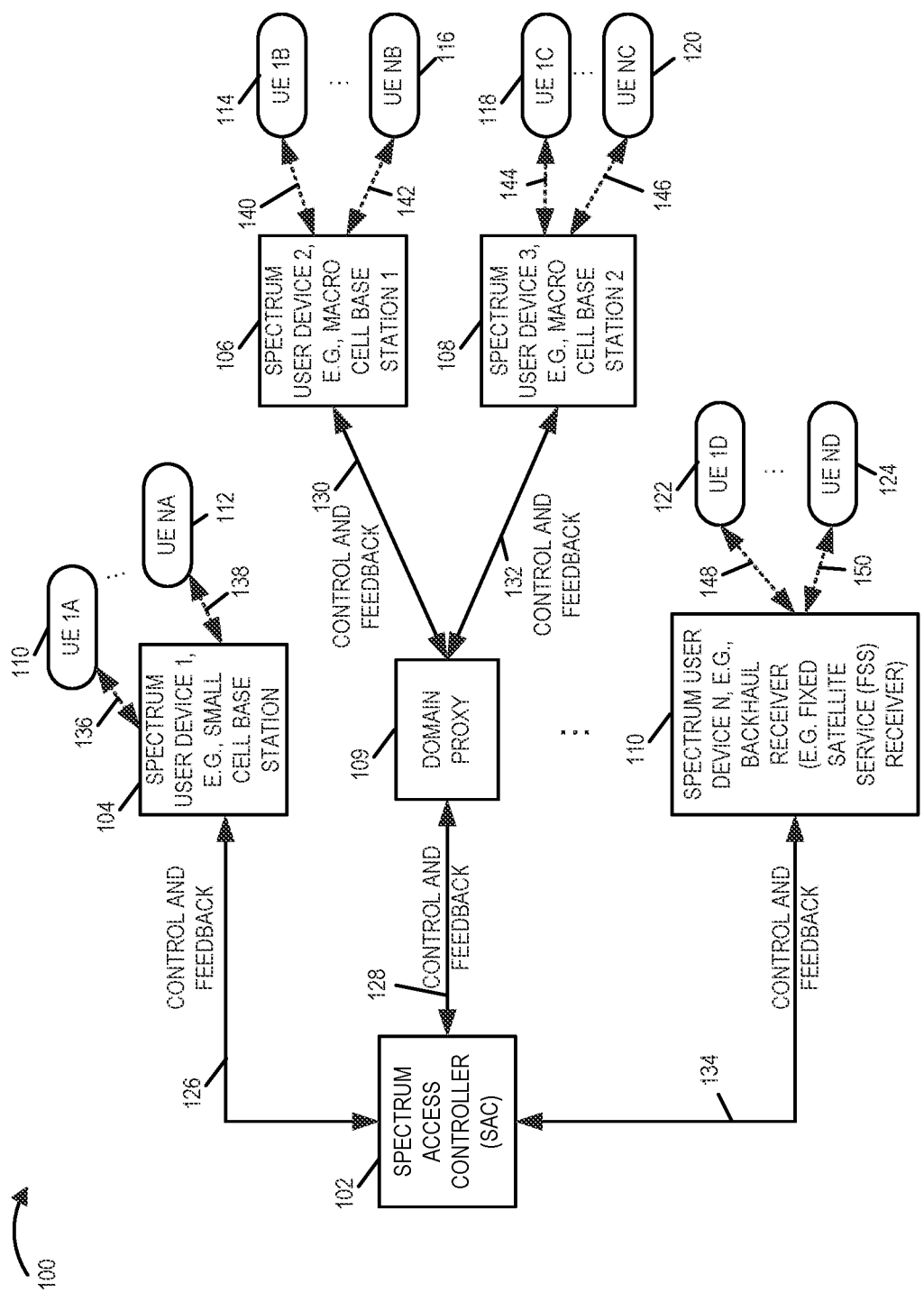
FIG. 1 is a drawing of an exemplary communications system including a spectrum access controller in accordance with an exemplary embodiment.

In various embodiments, in accordance with the present invention, a data driven spectrum sharing approach, e.g., a wireless frequency and/or frequency band sharing approach, is implemented amongst users of a shared band. The approach, in accordance with the present invention, incorporates data obtained from feedback, e.g., from spectrum user devices, e.g., base stations, access points, etc. and/or end user devices, e.g., cell phones into coverage area and/or interference related determinations or decisions which are used in making spectrum allocations. Frequency reuse between spectrum users can be, and sometimes is, increased when feedback information indicates less interference than predicted and/or coverage areas that are smaller then predicted based on a propagation model used to predicate coverage and/or interference which will be generated by use of spectrum by a spectrum user device to which spectrum can be allocated.

In various embodiments user feedback, along with propagation modeling, is used in making spectrum sharing decisions with feedback information from spectrum user devices and/or end user devices being used to refine or update one or more propagation model parameters used to predict radio signal propagation in the area in which the device providing the feedback information is located.

In various embodiments, in accordance with the present invention, propagation models and/or protection thresholds, e.g., interference thresholds used in making spectrum allocation decisions, are updated based on interference and/or performance information reported by the spectrum user devices and/or end user device of a frequency band, with the location of the spectrum user device and/or end user device providing the feedback information being known and taken into consideration when updating propagation model information, e.g., parameters, in many cases to improve upon the reliability of a propagation model used for geographic location from which feedback information is received.

Various embodiments, in accordance with the present invention, may, and sometimes do, increase spectrum use efficiency while reducing interference and/or communication outages in the band. This is because in cases where the propagation model parameters resulted in a coverage area prediction larger than which actually occurs, the parameter or parameters used for the region will be modified based on feedback to decrease the coverage area predicted by the propagation model being used and allow more band/frequency reuse. Over time, if the coverage area predicted by a propagation model is smaller than which actually occurs feedback information in the form of received power and/or interference reported from spectrum user or end user devices will trigger an update of a parameter or parameters used in a propagation model to increase the size of the predicted coverage area or areas to more accurately reflect the actual transmission range and interference associated with spectrum assignments to particular spectrum user devices. In this way by updating one or more model parameters based on geographic information and feedback corresponding to the geographic location propagation models used to predict interference and/or coverage areas will be dynamically adjusted to allow for more efficient spectrum assignment to devices and spectrum use in geographic areas than might be the case if initial or static propagation model parameters were used for spectrum allocation decision making.

In addition to, or as an alternative to, changing a propagation prediction model parameter used by a propagation model that is used predicted radio signal coverage as part of making a spectrum allocation decision, an interference threshold used in making a spectrum allocation decision can be changed based on spectrum user device and/or end user device feedback information. For example, when feedback information indicates communications connections are being dropped or interfered with to an unacceptable level in a geographic region, an interference threshold used in making spectrum allocation decisions can be, and sometimes is, modified to decrease the chance of spectrum allocation to multiple devices in the region encountering the unacceptable level of interference. In cases where interference information indicates little or no interference, an interference threshold can be, and sometimes is, changed to increase spectrum assignment and/or reuse in the area in which little or no interference is reported. In this way spectrum reuse can be dynamically increased or decreased based on feedback indicating acceptable or unacceptable interference conditions in a geographic area. The dynamic changing of one or more interference thresholds as opposed to relying on a static threshold can, like the change in a propagation prediction parameter, result in more efficient spectrum use than might be the case if static interference thresholds were used for spectrum allocations.

The spectrum access controller of the present invention can, and sometimes does, control allocation of spectrum to devices corresponding to multiple different system operators and/or operators of different types. Thus, in contrast to devices which are operated by a single system operator and might control spectrum allocation within a single operator's system, the spectrum access controller of the present invention intentionally allows for and sometimes does control spectrum allocation between multiple different operators, e.g., potentially with different priority levels with regard to the right to spectrum, and/or operating devices of different types some of which may not be able to directly communicate with one another and/or have knowledge of the coverage area of other devices in the system or in other systems to which spectrum may be allocated.

Benefits of some embodiments of the present invention will now be described. The spectrum sharing approach, in accordance with the present invention, can be used for any band without requiring users of the allocated spectrum to perform channel sensing, e.g., sensing of a channel prior to transmission in the channel. Parameters used to control spectrum sharing can be, and sometimes are, automatically adjusted, e.g., tuned, based on spectrum user device (e.g., base station or access point feedback) feedback information and/or user device feedback information. This can result in higher spectrum use efficiency than other systems where static parameters or interference thresholds are used. The use of feedback information allows interference concerns to be automatically resolved with spectrum assignments and/or reuse being increased or decreased automatically based on feedback to achieve efficient spectrum use while still giving devices/system operators the priority to which they may be entitled.

In some embodiments, in accordance with the present invention, protection and/or coexistence thresholds, e.g., one or more interference thresholds, used by a spectrum access controller (SAC) are adapted based on device and/or user feedback. The SAC allocates spectrum to be used by devices in a tiered use band based on user priorities. Propagation models are used along with device protection and/or coexistence thresholds in some embodiments to determine band and/or the allocation of one or more sets of frequencies within a band. The thresholds are adapted in some embodiments based on data derived from spectrum user device and/or end user device feedback information. The feedback information can be, and sometimes is, in the form of statistical reporting, such as signal strength, quality, data error rates and/or other signal measurements. In various embodiments spectrum allocation in terms of the frequency band and/or set of frequencies in a band assigned are assigned in a manner that is adapted over time based on geographically relevant feedback information to devices in one or more geographic regions to which feedback information relates to improve or maximize spectrum use efficiency while avoiding levels of mutual interference that can result in unacceptable communications conditions such as dropped connections and/or unacceptably high error rates.

Whether two of more spectrum user devices may reuse the same frequency in the band is determined in some embodiments by determining the overlap of the coverage contours of the spectrum user devices and the expected interference in the overlapping coverage contour. The expected interference is compared to an interference threshold, e.g., a maximum permitted interference threshold in some embodiments, to determine if it will be an acceptable amount of interference, e.g., if the predicted or estimated maximum interference in the overlap area will be below the maximum permitted interference threshold. If the interference in the overlap area is less than the interference threshold, then the devices may reuse the same frequency and are allocated the same set of frequencies in some embodiments thereby increasing spectrum use efficiency as opposed to cases where the spectrum user devices are allocated different frequencies and/or frequencies in different bands. If it is determined that two spectrum user devices can not share the same frequencies, e.g., because the expected interference will exceed an interference threshold, in some embodiments they are allocated different frequencies to avoid mutual interference where the different frequencies allocated to the two devices may be in the same or a different frequency band.

Data derived from devices/user feedback in a geographic area is used in various embodiments to adapt the threshold, e.g., maximum permitted interference threshold, used in making spectrum allocations in the geographic region from which the feedback information was received. In the case of feedback indicating lack of interference and/or low use of available channel bandwidth, the interference threshold used for the geographic region may be modified, e.g., loosened, to increase spectrum sharing.

In various embodiments to facilitate the collection of meaningful feedback information the spectrum access controller can, and sometimes does, schedule individual spectrum user devices and/or end user devices in a geographic region to transmit training signals at known predictable times. The training signals are transmitted in some cases at a known predetermined power level. Devices in the region can, and sometimes do, measure the received power of the transmitted signals and communicate the received power information and the location at which the measurement was made to the system access controller. Thus, the spectrum access controller controls systems or different operators and/or different types to transmit known signals at predictable times and receives feedback about such signals from devices which measure them. To facilitate collection of data the spectrum access controller not only schedules transmissions of training signals but also the monitoring for, measuring of, and reporting of signal measurements.

While various features discussed in the summary are used in some embodiments, it should be appreciated that not all features are required or necessary for all embodiments and the mention of features on the summary should in no way be interpreted as implying that the feature is necessary or critical for all embodiments. Numerous additional features and embodiments are discussed in the detailed description which follows. Numerous additional benefits will be discussed in the detailed description which follows.

DETAILED DESCRIPTION

FIG. 1 is a drawing of an exemplary communications system 100 including a spectrum access controller (SAC) 102 in accordance with an exemplary embodiment. Exemplary communications system 100 further includes a plurality of spectrum user devices (spectrum user device 1 104, spectrum user device 2 106, spectrum user device 3 108, . . . , spectrum user device N 110), which may and sometime do, request spectrum from SAC 102.

Spectrum user device 1 104 is, e.g., a small cell base station. Spectrum user device 2 106 is, e.g., a macro cell base station 1. Spectrum user device 3 108 is, e.g., macro cell base station 2. Spectrum user device N is, e.g., a backhaul receiver, e.g., a fixed satellite service (FSS) receiver. In various embodiments some of the spectrum user devices in system 100 may, and sometime do, correspond to different service providers, e.g., different Mobile network operators (MNOs) and/or different MVNOs (Mobile Network Virtual Operators). In some embodiments some of the spectrum user devices in system 100 may, and sometime do, use different communications technologies and/or different communications protocols. In various embodiments some of the spectrum user devices in system 100 may, and sometime do, have different communications ranges and/or use different transmission power levels and/or are tolerant to different levels of interference.

Communications system 100 further includes a plurality of end user devices including user equipment (UE) 1A 110, UE NA 112, UE 1B 114, UE NB 116, UE 1C 118, UE NC 120, UE 1D 122, UE ND 124.

Spectrum user device 1 104 is coupled to SAC 102 via communications link 126 over which control and feedback information is communicated. Spectrum user device 2 106 is coupled to SAC 102 via communications link 130, domain proxy 109 and communications link 128 over which control and feedback information is communicated. Spectrum user device 3 108 is coupled to SAC 102 via communications link 133, domain proxy 109 and communications link 128 over which control and feedback information is communicated. Spectrum user device N 110 is coupled to SAC 102 via communications link 134 over which control and feedback information is communicated. Control information includes spectrum user device registration signals including spectrum user device ID information, spectrum user device location information and spectrum user device maximum transmission power level information, spectrum request signals, spectrum allocation signals, and training signal information, and training signal schedule information. Feedback information includes feedback reports from the spectrum user devices, said feedback reports including, e.g., measurements (e.g., by the spectrum user devices and/or by end user device being serviced by the spectrum user device) of reference signal received power (RSRP) and interference reports.

UEs (UE 1A 110, . . . , UE NA 112) are coupled to spectrum user device 1 104 via wireless communications links (136, . . . , 138) respectively. UEs (UE 1B 114, UE NB 116) are coupled to spectrum user device 2 106 via wireless communications links (140, . . . , 142) respectively. UEs (UE 1C 118, . . . , UE NC 120) are coupled to spectrum user device 3 108 via wireless communications links (144, . . . , 146) respectively. UEs (UE 1D 122, . . . , UE ND 124) are coupled to spectrum user device N 110 via wireless communications links (148, . . . , 150) respectively.

Figure 2A:
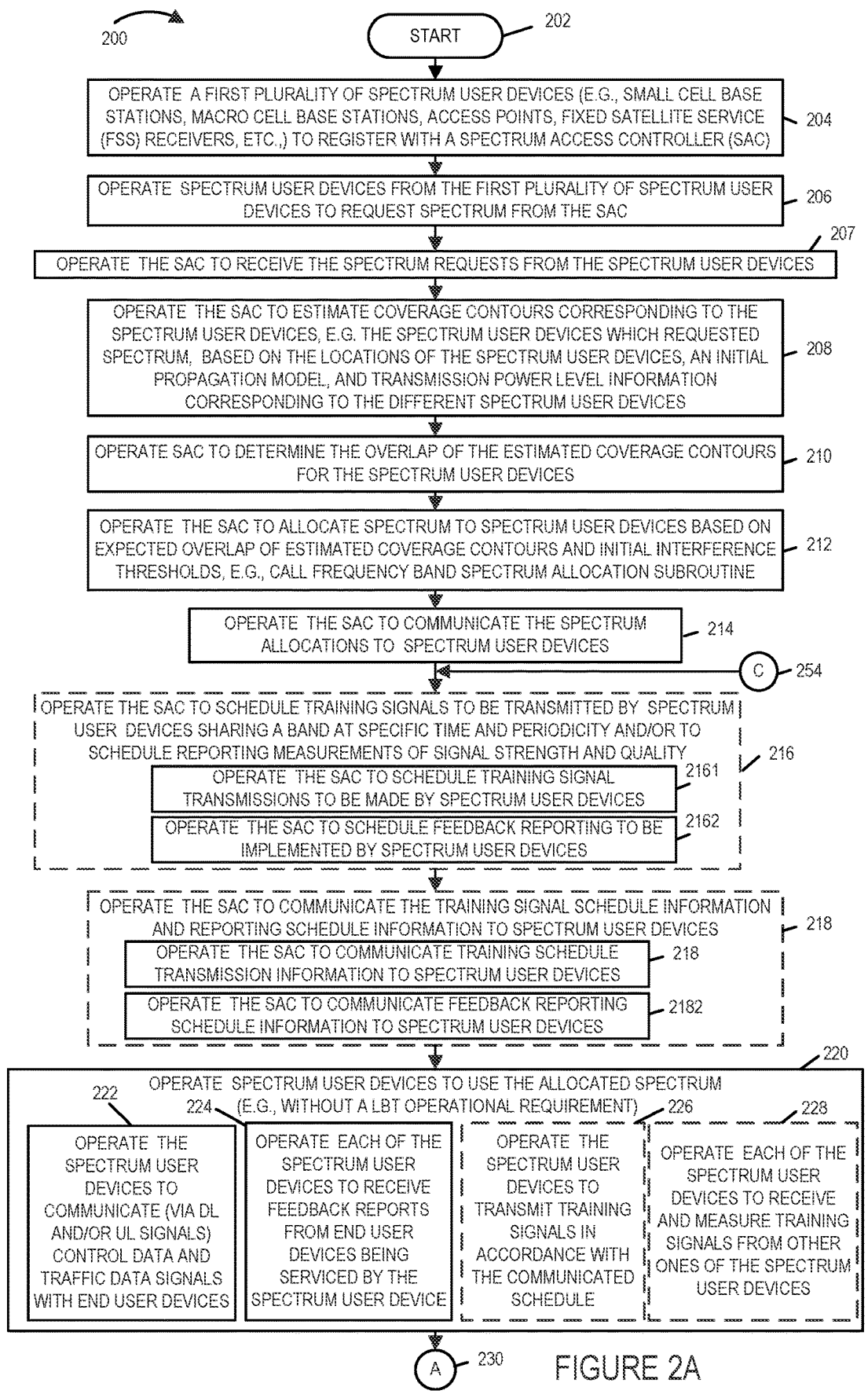
FIG. 2A is a first part of a flowchart of an exemplary method of operating a communications system including a spectrum access controller in accordance with an exemplary embodiment.
Figure 2B:
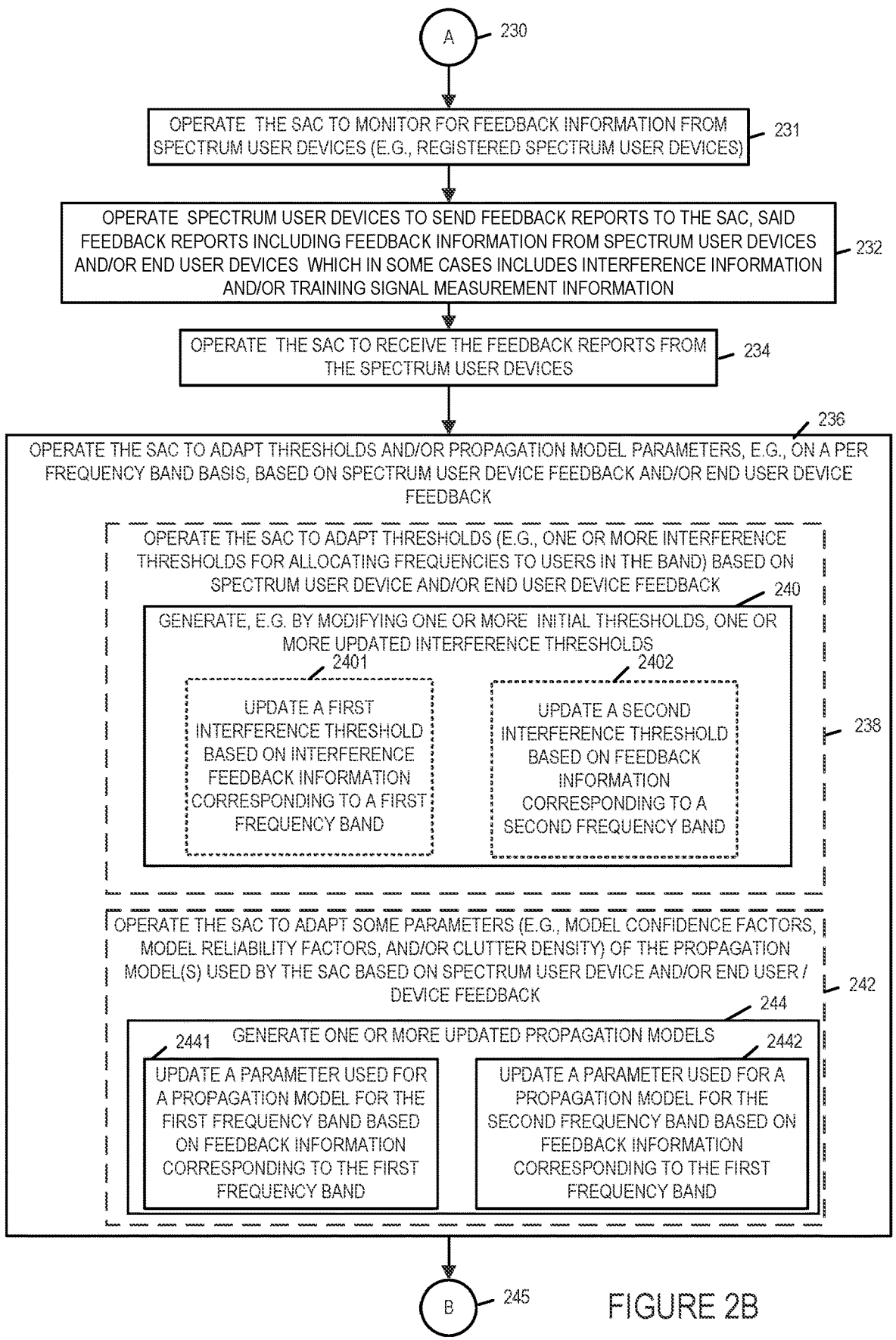
FIG. 2B is a second part of a flowchart of an exemplary method of operating a communications system including a spectrum access controller in accordance with an exemplary embodiment.

FIG. 2, comprising the combination of FIG. 2A, FIG. 2B and FIG. 2C, is a flowchart 200 of an exemplary method of operating a communications system, e.g., communications system 100, including a spectrum access controller, e.g., SAC 102, and a plurality of spectrum user devices, e.g., spectrum user devices (spectrum user device 1 104, spectrum user device 2 106, spectrum user device 3 108, spectrum user device N 110, in accordance with an exemplary embodiment. In some embodiments, the spectrum user devices are, e.g., cellular base stations, small cell base stations, Citizens Broadband Radio Service (CBRS) devices, Fixed satellite service (FSS) devices, and/or other devices which can operate as access points. In some embodiments, the spectrum user devices correspond to different operators, e.g., different MNO and/or different MVNO operators. In some embodiments, the spectrum user devices include devices of different types (e.g., devices using different technologies, e.g., 5G wireless cellular, WiFi, LoRa, IoT, etc., and/or different communications protocols) and/or devices having different coverage ranges.

Operation of the exemplary method starts in step 202 in which the communications system is powered on and initialized. Operation proceeds from step 202 to step 204. In step 204 a first plurality of spectrum user devices, e.g., small cell base stations, macro cell base stations, access points, fixed satellite service (FSS) receivers, etc., register with the SAC. The registration operations of step 204 includes, for an individual spectrum user device, the spectrum user device sending a registration request message to the SAC, e.g., a registration request including an ID corresponding to the spectrum user device, the location of the spectrum user device, and maximum transmission power information for the spectrum user device, and further includes the SAC sending a registration response, e.g. registration accept message, to the spectrum user device. Operation proceeds from step 204 to step 206.

In step 206 spectrum user devices from the first plurality of spectrum user devices request spectrum, e.g., the spectrum user devices desiring spectrum allocations, send spectrum requests to the SAC. In step 207 the SAC receives the spectrum request from the spectrum user devices. Operation proceeds from step 207 to step 208.

In step 208 the SAC estimates coverage contours corresponding to the spectrum user devices, e.g., the spectrum user devise which requested spectrum, based on the locations of the spectrum user devise, an initial propagation model, and transmission power level information corresponding to the different spectrum user devices. In some embodiments, estimating a coverage contour, corresponding to a spectrum user device, is based on a propagation model (e.g., a propagation model based on initial parameters (e.g., initial parameters including initial confidence factors, initial reliability factors, and an initial clutter density).

Operation proceeds from step 208 to step 210. In step 210 the SAC determines the overlap of the estimated coverage contours for the spectrum user devices, e.g., the SAC determines overlapping coverage contour areas based on the estimated coverage contours. Operation proceeds from step 210 to step 212.

Figure 3A:
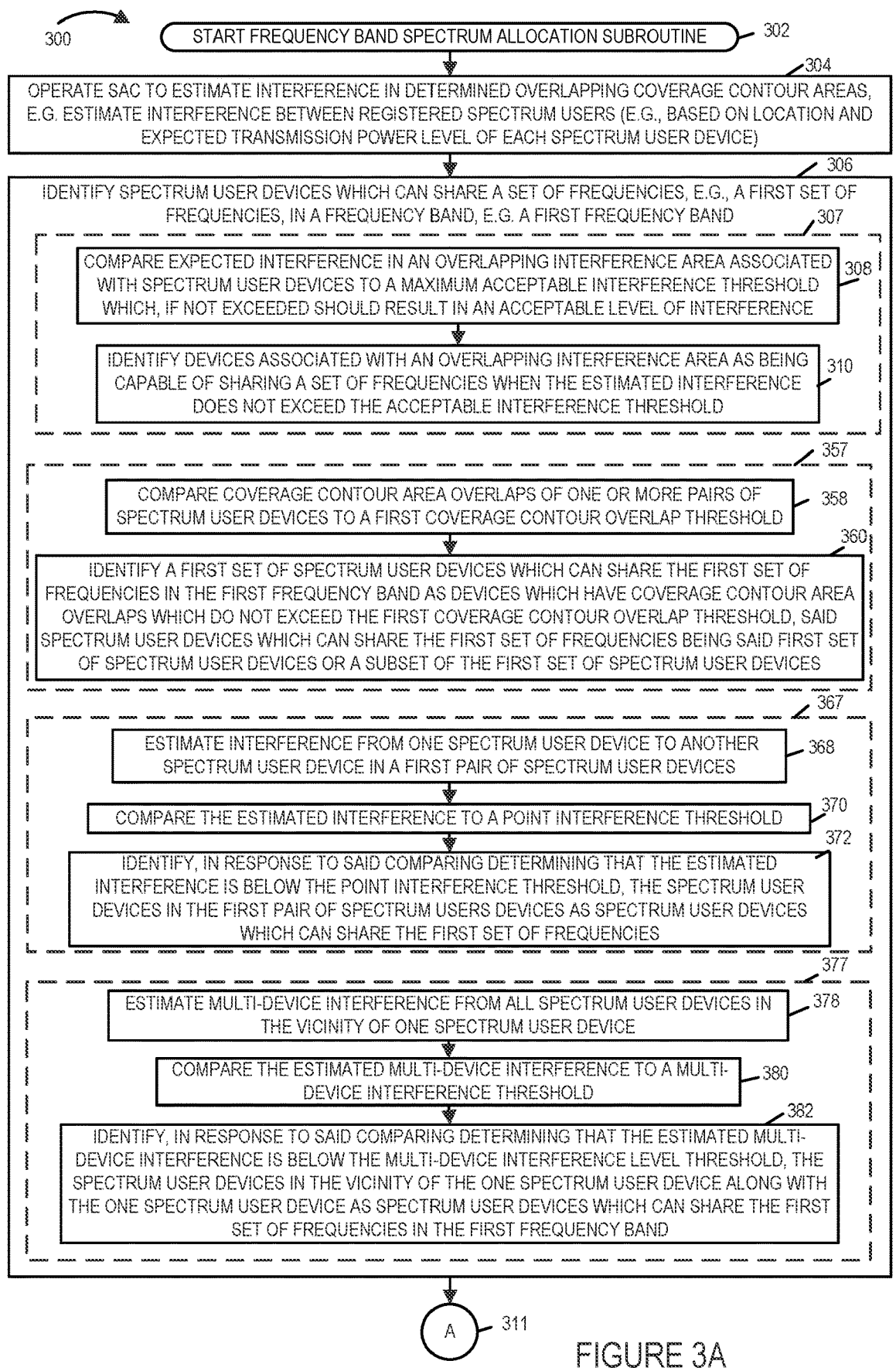
FIG. 3A is a first part of a frequency band spectrum allocation subroutine which may be implemented by a spectrum access controller in accordance with an exemplary embodiment.
Figure 3B:
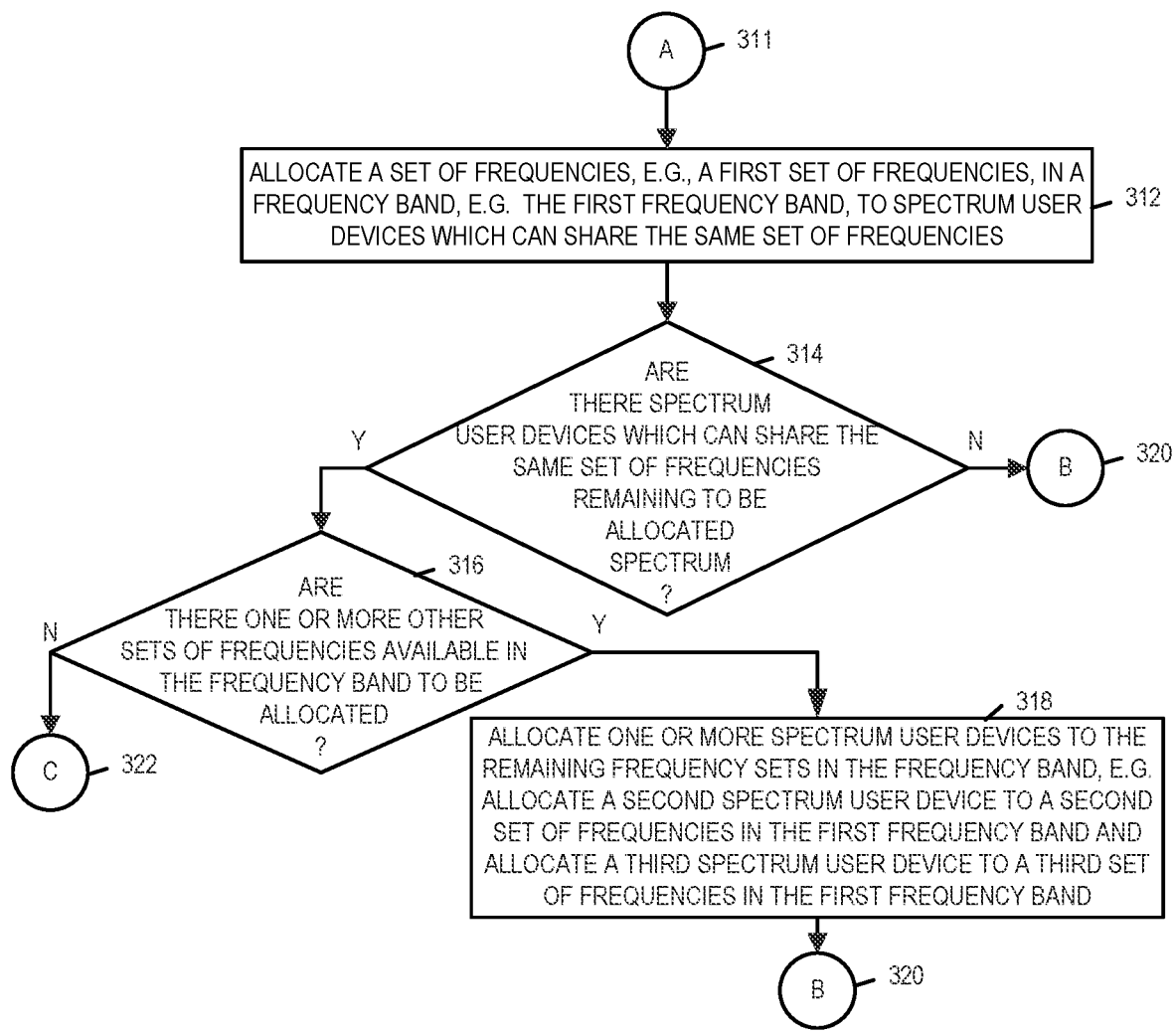
FIG. 3B is a second part of a frequency band spectrum allocation subroutine which may be implemented by a spectrum access controller in accordance with an exemplary embodiment.
Figure 3C:
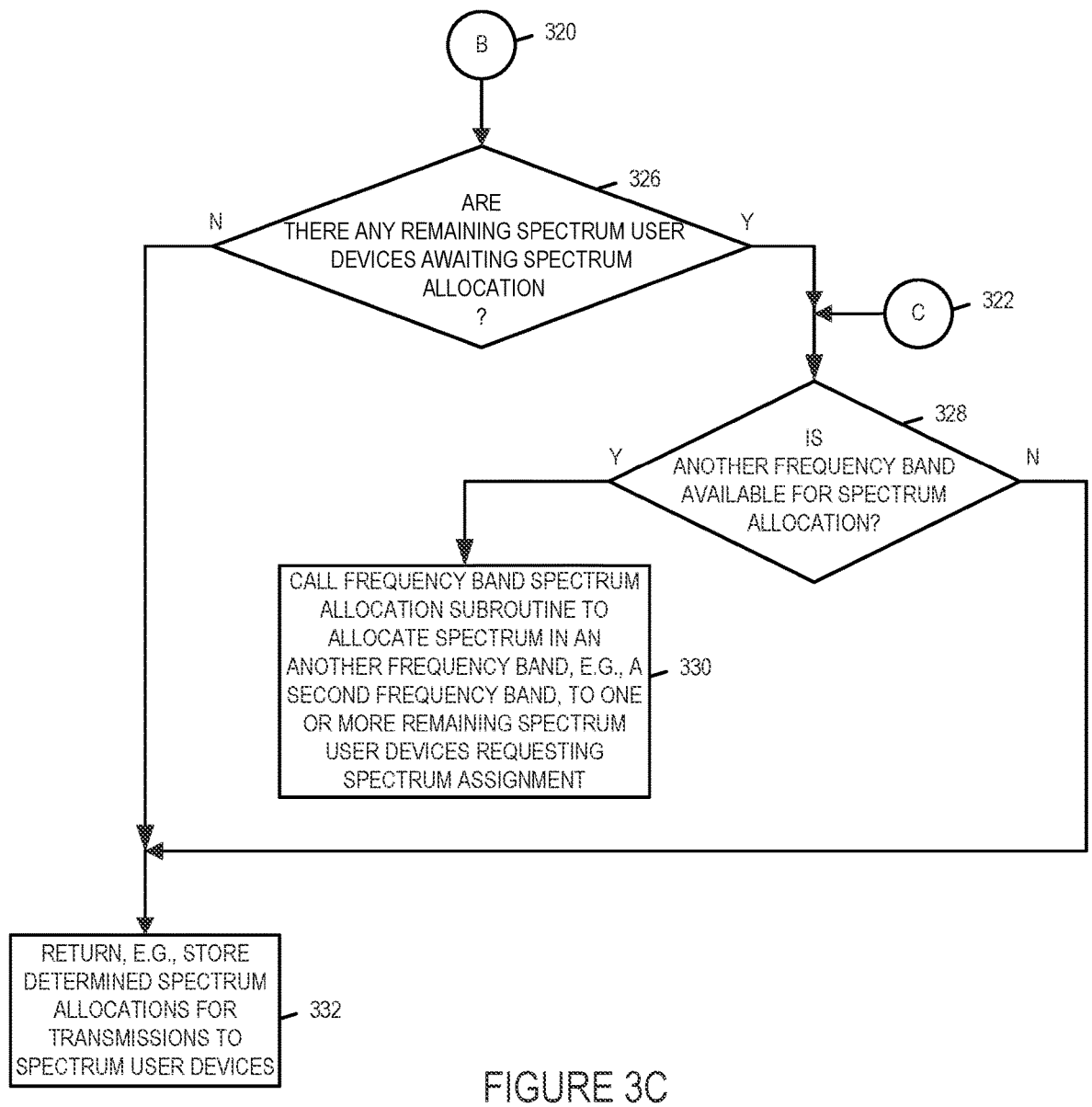
FIG. 3C is a third part of a frequency band spectrum allocation subroutine which may be implemented by a spectrum access controller in accordance with an exemplary embodiment.
Figure 3:
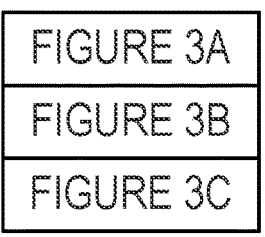
FIG. 3 comprises the combination of FIG. 3A, FIG. 3B and FIG. 3C.

In step 212 the SAC allocates spectrum to spectrum user device based on expected overlap of estimated coverage contours and initial interference thresholds, e.g., the SAC calls a frequency band spectrum allocation subroutine, e.g., frequency band spectrum allocation subroutine 300 of FIG. 3. FIG. 3, comprising the combination of FIG. 3A, FIG. 3B and FIG. 3C is a flowchart of an exemplary frequency band spectrum allocation subroutine 300 which may be and sometimes is implemented by a spectrum access controller in accordance with an exemplary embodiment.

The frequency band spectrum allocation routine starts in step 302, e.g., in response to a call from step 212. Operation proceeds from start step 302 to step 304. In step 304 the SAC estimates interference in determined overlapping coverage contours, e.g., estimates interference between registered spectrum users (e.g., based on location and expected transmission power level of each spectrum user device). Thus, in step 304 the SAC estimates interference in determined overlapping coverage contour areas. Operation proceeds from step 304 to step 306. In step 306 the SAC identifies spectrum user devices which can share a set of frequencies, e.g., a first set of frequencies, in a frequency band, e.g., a first frequency band. For example, in step 306 the SAC identifies a first set of spectrum user devices which can share a first set of frequencies in a first frequency band. Step 306 may be implemented using a plurality of different alternative approaches. Each block (307, 357, 367, 377) includes an alternative set of steps which may be, and sometimes is, used to implement step 306, e.g., depending upon the particular embodiment.

The approach of block 307 includes step 308 and step 310 In some embodiments, step 306, e.g. when implemented including steps 308 and 310, includes identifying a first set of spectrum user devices which can share the first set of frequencies in the first frequency band based on the estimates of interference in the overlapping coverage contour areas. In step 308 the SAC compares expected interference in an overlapping interference area associated with spectrum user devices to a maximum acceptable interference threshold, which if not exceeded should result in an acceptable level of interference. For example, as part of step 308 the SAC compares an estimated (e.g., expected) level of interference to an interference threshold. Operation proceeds from step 308 to step 310. In step 310 the SAC identifies devices associated with an overlapping interference area as being capable of sharing a set of frequencies when the estimated interference does not exceed the acceptable interference threshold.

The approach of block 357 includes steps 358 and 360. In step 358 the SAC compares coverage contour area overlaps of one or more pairs of spectrum user devices to a first coverage contour overlap threshold (e.g., a threshold corresponding to a 10 percent overlap of contours of spectrum user devices in a pair of spectrum user devices or a fixed size threshold, e.g., an overlap area of a predetermined size). Operation proceeds from step 358 to step 360. In step 360 the SAC identifies a first set of spectrum user devices which can share the first set of frequencies in the first frequency band as devices which have coverage contour area overlaps which do not exceed the first coverage contour overlap threshold, said spectrum user devices which can share the first set of frequencies being said first set of spectrum user devices or a subset (e.g., a set including less than all of the first set of user devices) of the first set of spectrum user devices.

The approach of block 367 includes steps 368, 370 and 372. In step 368 the SAC estimates interference from one spectrum user device to another spectrum user device in a first pair of spectrum user devices. Operation proceeds from step 368 to step 370. In step 370 the SAC compares the estimated interference to a point interference threshold (e.g., a predetermined interference level threshold over which interference is unacceptable from a spectrum sharing perspective). Operation proceeds from step 370 to step 372. In step 372 the SAC identifies, in response to said comparing determining that the estimated interference is below the point interference threshold, the spectrum user devices in the first pair of spectrum user devices as spectrum user devices which can share the first set of frequencies.

The approach of block 377 includes steps 378, 380 and 382. In step 378 the SAC estimates multi-device interference from all spectrum user devices in the vicinity (e.g., coverage area, coverage area contour, or a predetermined distance) of one spectrum user device (e.g., a first spectrum user device). Operation proceeds from step 378 to step 380. In step 380 the SAC compares the estimated multi-device interference to a multi-device interference threshold (e.g., a predetermined interference level threshold over which interference is unacceptable from a multi-device spectrum sharing threshold). Operation proceeds from step 380 to step 382. In step 382 the SAC identifies, in response to said comparing determining that the estimated multi-device interference is below the multi-device interference level threshold, the spectrum user devices in the vicinity of the one spectrum user device along with the one spectrum user device as spectrum user devices which can share the first set of frequencies in the first frequency band.

Operation proceeds from step 306 to step 312 shown in FIG. 3B via connecting node A 311. In step 312 the SAC allocates a set of frequencies, e.g., a first set of frequencies, in a frequency band, e.g., the first frequency band, to spectrum user devices which can share the same set of frequencies. Operation proceeds from step 312 to step 314.

In step 314 the SAC if there are spectrum user devices which can share the same set of frequencies remaining to be allocated. If there are spectrum user devices which can share the same set of frequencies remaining to be allocated then operation proceeds from step 314 to step 316; otherwise, operation proceeds from step 314, to step 326, shown in FIG. 3C, via connecting node B 320. In this way, if there are additional spectrum user devices waiting for spectrum, they may be allocated frequencies in another band, e.g., in step 330, assuming frequencies are available in another band for allocation.

In step 316 the SAC determines if there are one or more sets of frequencies available in the frequency band, e.g., the first frequency band, to be allocated. If there are one or more other sets of frequencies available in the frequency band to be allocated, then operation proceeds from step 316 to step 318; otherwise, operation proceeds from step 316, via connecting node C 322 to step 328.

Returning to step 318, in step 318 the SAC allocates one or more spectrum user devise to the remaining frequency sets in the frequency band, e.g., the SAC allocates a second spectrum user device to a second set of frequencies in the first frequency band and allocates a third spectrum user device to a third set of frequencies in the first frequency band. Operation proceeds from step 318 via connecting node B320 to step 326.

In step 326 the SAC determines if there are any remaining spectrum user devices awaiting allocation. If the determination is that there is at least one remaining user device awaiting spectrum allocation, then operation proceeds from step 326 to step 328; otherwise, operation proceeds from step 326 to step 332.

In step 328 the SAC determines whether or not there is another frequency band available for spectrum allocation. If the determination is that there is another frequency band available for spectrum allocation, then operation proceeds from step 328 to step 330; otherwise, operation proceeds from step 328 to step 332. In step 330, the SAC calls the frequency band spectrum allocation subroutine, e.g., subroutine 300 which corresponds to the steps of FIGS. 3A, 3B and 3C in combination, to allocate spectrum in an another, e.g., a second frequency band, to one or more remaining spectrum user devise requesting spectrum assignment. In step 330 the SAC returns, e.g., stored the determined spectrum allocations for transmissions to the spectrum user devices.

Operation proceeds from step 212 to step 214. In step 214 the SAC communicates the spectrum allocations to the spectrum user devices. In some embodiments (e.g., embodiments including optional step 216 and step 218), operation proceeds from step 214 to step 216. In other embodiments, operation proceeds from step 214 to step 220.

In step 216 the SAC schedules training signal to be transmitted by the spectrum user devise sharing a band at specific time and periodicity and/or schedules reporting measurements of signal strength and signal quality. Step 216 includes step 2161 and step 2162. In step 2161 the SAC schedules training signal transmissions to be made by spectrum user devices (e.g., registered spectrum user devices. In step 2162 the SAC schedules feedback reporting to be implemented by spectrum user devices (e.g., registered spectrum user devices).

Operation proceeds from step 216 to step 218. In step 218 the SAC communicates the training signal schedule information and reporting schedule information to the spectrum user devices. Step 218 includes step 2181 and step 2182. In step 2181 the SAC communicates training schedule information to spectrum user devices. In step 2182 the SAC communicates feedback reporting schedule information to the spectrum user devices. Operation proceeds from step 218 to step 220.

In step 220 the spectrum user devices are operated to use the allocated spectrum, e.g., with a listen-before-talk (LBT) requirement. Step 220 includes steps 222 and 224, and may, and sometimes does include one or both of optional steps 226 and 228. In step 222 the spectrum user devices communicate (via downlink (DL) and uplink (UL) signals), control data and traffic data signals with end user devices. In step 224 each of the spectrum user devices receives feedback reports from end user devices being serviced by the spectrum user device. In step 226 each of the spectrum user devise transmits training signals in accordance with the communicated schedule. In step 228 each of the spectrum user devices receives and measures training signals from other ones of the spectrum user devices. Operation proceeds from step 220, via connecting node A 230 to step 231.

In step 231 the SAC monitors for feedback information from spectrum user devices, e.g., registered spectrum user devices, based on the feedback reporting schedule. Operation proceeds from step 231 to step 232. In step 232 the spectrum user devices send feedback reports to the SAC, said feedback reports including information from spectrum user devise and/or end user devices, which in some cases included interference information and/or training signal measurement information. Operation proceeds from step 232 to step 234. In step 234 the SAC receives the feedback reports (e.g., feedback reports communicating feedback information, e.g., received signal strength information, received signal quality information, interference information, and/or training signal measurement information) from the spectrum user devices. Operation proceeds from step 234 to step 236.

In step 236 the SAC adapts, e.g., updates, thresholds and/or propagation model parameters (e.g., a confidence factor, a reliability factor, or a cluster density factor), e.g., on a per frequency band basis, based on spectrum user device feedback and/or end user device feedback. Step 236 includes step 238 and step 242. During an iteration of step 236 one or both of steps 238 and 242 are implemented, e.g., depending on the implemented exemplary embodiment.

In step 238 the SAC adapts thresholds, e.g., one or more interference thresholds for allocating frequencies to users in the band, based on spectrum user device and/or end user device feedback. Step 238 includes step 240 in which the SAC generates, e.g., by modifying one or more initial interference thresholds (e.g., initial maximum interference thresholds), one or more updated interference thresholds (updated maximum interference thresholds). In step 240, modifying an interference threshold may, and sometime does, include increasing the interference threshold (thereby increasing the amount of spectrum reuse which will be permitted) when received interference information (from feedback information) indicates that the spectrum user devices are not suffering from interference. In step 240, modifying an interference threshold may, and sometime does, include decreasing the interference threshold (thereby decreasing the amount of spectrum reuse which will be permitted) when received interference information (from feedback information) indicates that the spectrum user devices are suffering from an unacceptable amount of interference.

Step 240 may, and sometimes does, include step 2401, in which the SAC updates a first interference threshold (e.g., for the first frequency band) based on interference feedback information corresponding to a first frequency band. Step 240 may, and sometimes does, include step 2402, in which the SAC updates a second interference threshold, based on interference feedback information corresponding to the first frequency band. In some embodiments, the second interference threshold (of step 2402) corresponds to the first frequency band. In some embodiments, the second interference threshold (of step 2402) corresponds to a second frequency band and the second interference threshold is used in making second frequency band allocation.

In step 242 the SAC adapts, e.g., updates, some parameters, e.g., model (e.g., Irregular Terrain Model (ITM) model) confidence factors, model (e.g., ITM model) reliability factors and/or clutter density, of the propagation model(s) used by the SAC based on spectrum user device and/or end user device feedback. Step 242 may, and sometimes does include updating one or more parameters used in said propagation model including modifying a parameter (e.g., a confidence factor, a reliability factor, or a clutter density) to increase the propagation range predicted by the model when reported interference in a first coverage area exceeds an estimated amount of interference in the first coverage area. Step 242 may, and sometimes does include updating one or more parameters used in said propagation model including modifying a parameter (e.g., a confidence factor, a reliability factor, or a clutter density) to decrease the propagation range predicted by the propagation model when reported interference in a first coverage area is below an estimated amount of interference in the first coverage area.

Step 242 includes 244 in which the SAC generates one or more updated propagation models, each updated propagation module including at least one updated parameter. Step 244 may, and sometimes does, include step 2441, in which the SAC updates a parameter used for a propagation model for the first frequency band based on feedback information corresponding to the first frequency band. Step 244 may, and sometimes does, include step 2442 in which the SAC updates a parameter used for the second frequency band, based on feedback information corresponding to the first frequency band. Thus, in step 2442 the SAC, may and sometimes does, updates a propagation parameter used for estimating coverage contours in a second frequency band, which is different from said first frequency band, said updating based on feedback information corresponding to the first frequency band.

Operation proceeds from step 236 via connecting node B 245 to step 246. In step 246 the SAC determines revised coverage contours, e.g., on a per frequency band basis, corresponding to spectrum user devices, e.g., the spectrum user devices which requested spectrum, based on the locations of the spectrum user devise, the updated propagation model, and power level information corresponding to the different spectrum user devices. Operation proceeds from step 246 to step 248.

In step 248 the SAC determines revised overlapping coverage contours areas of the spectrum user devices based on the estimated revised coverage contours. Operation proceeds from step 248 to step 250.

In step 250 the SAC allocates spectrum to spectrum user devices based on expected overlap of estimated revised coverage contours and/or updated interference thresholds, e.g., call frequency band spectrum allocation subroutine 300. The frequency band spectrum allocation routine 300 starts in step 302 shown in FIG. 3A, e.g., in response to a call from step 250. Operation proceeds from start step 302 to step 304. In step 304 the SAC estimates interference in determined overlapping revised coverage contour areas, e.g., estimates interference between registered spectrum users (e.g., based on location and expected transmission power level of each spectrum user device). Operation proceeds from step 304 to step 306. The description below for this iteration of step 306 corresponds to the approach of block 307. However, it should be appreciated that alternatively, any of alternative blocks 357, 367, or 377 may be used in place of block 307 to implement step 306. In step 306 the SAC identifies spectrum user devices (e.g., a second set of spectrum user devices) which can share a set of frequencies, e.g., the first set of frequencies, in a frequency band, e.g., the first frequency band, e.g., based on the estimates of interference in the revised overlapping coverage contour areas. Step 306 includes step 308 and step 310. In step 308 the SAC compares expected interference in a revised overlapping interference area associated with spectrum user devices to a maximum acceptable revised interference threshold, which if not exceeded should result in an acceptable level of interference. Operation proceeds from step 308 to step 310. In step 310 the SAC identifies devices associated with a revised overlapping interference area as being capable of sharing a set of frequencies when the estimated interference does not exceed the acceptable revised interference threshold. Operation proceeds from step 306 via connecting node A 311 to step 312, shown in FIG. 3B. In step 312 the SAC allocates a set of frequencies, e.g., the first set of frequencies, in a frequency band, e.g., the first frequency band, to spectrum user devices which can share the same set of frequencies. Operation proceeds from step 312 to step 314.

In step 314 the SAC if there are spectrum user devices which can share the same set of frequencies remaining to be allocated. If there are spectrum user devices which can share the same set of frequencies remaining to be allocated then operation proceeds from step 314 to step 316; otherwise, operation proceeds from step 314, via connecting node B 320 to step 326 shown on FIG. 3C.

In step 316 the SAC determines if there are one or more sets of frequencies available in the frequency band, e.g., the first frequency band, to be allocated. If there are one or more other sets of frequencies available in the frequency band to be allocated, then operation proceeds from step 316 to step 318; otherwise, operation proceeds from step 316, via connecting node C 322 to step 328, shown in FIG. 3C.

Returning to step 318, in step 318 the SAC allocates one or more spectrum user devices to the remaining frequency sets in the frequency band, e.g., the SAC allocates a second spectrum user device to a second set of frequencies in the first frequency band and allocates a third spectrum user device to a third set of frequencies in the first frequency band. Operation proceeds from step 318 via connecting node B 320 to step 326, shown in FIG. 3C.

In step 326 the SAC determines if there are any remaining spectrum user devices awaiting allocation. If the determination is that there is at least one remaining user device awaiting spectrum allocation, then operation proceeds from step 326 to step 328; otherwise, operation proceeds from step 326 to step 332.

In step 328 the SAC determines whether or not there is another frequency band available for spectrum allocation. If the determination is that there is another frequency band available for spectrum allocation, then operation proceeds from step 328 to step 330; otherwise, operation proceeds from step 328 to step 332. In step 330, the SAC calls the frequency band spectrum allocation subroutine, e.g., subroutine 300, to allocate spectrum in an another, e.g., a second frequency band, to one or more remaining spectrum user devise requesting spectrum assignment. In step 330 the SAC returns, e.g., stored the determined spectrum allocations for transmissions to the spectrum user devices.

Operation proceeds from step 250 to step 252. In step 252 the SAC communicates the spectrum allocations to the spectrum user devices. Operation proceeds from step 252 via connecting node C 254 to optional step 216 or to step 220, depending upon the implemented embodiment.

Figure 4:
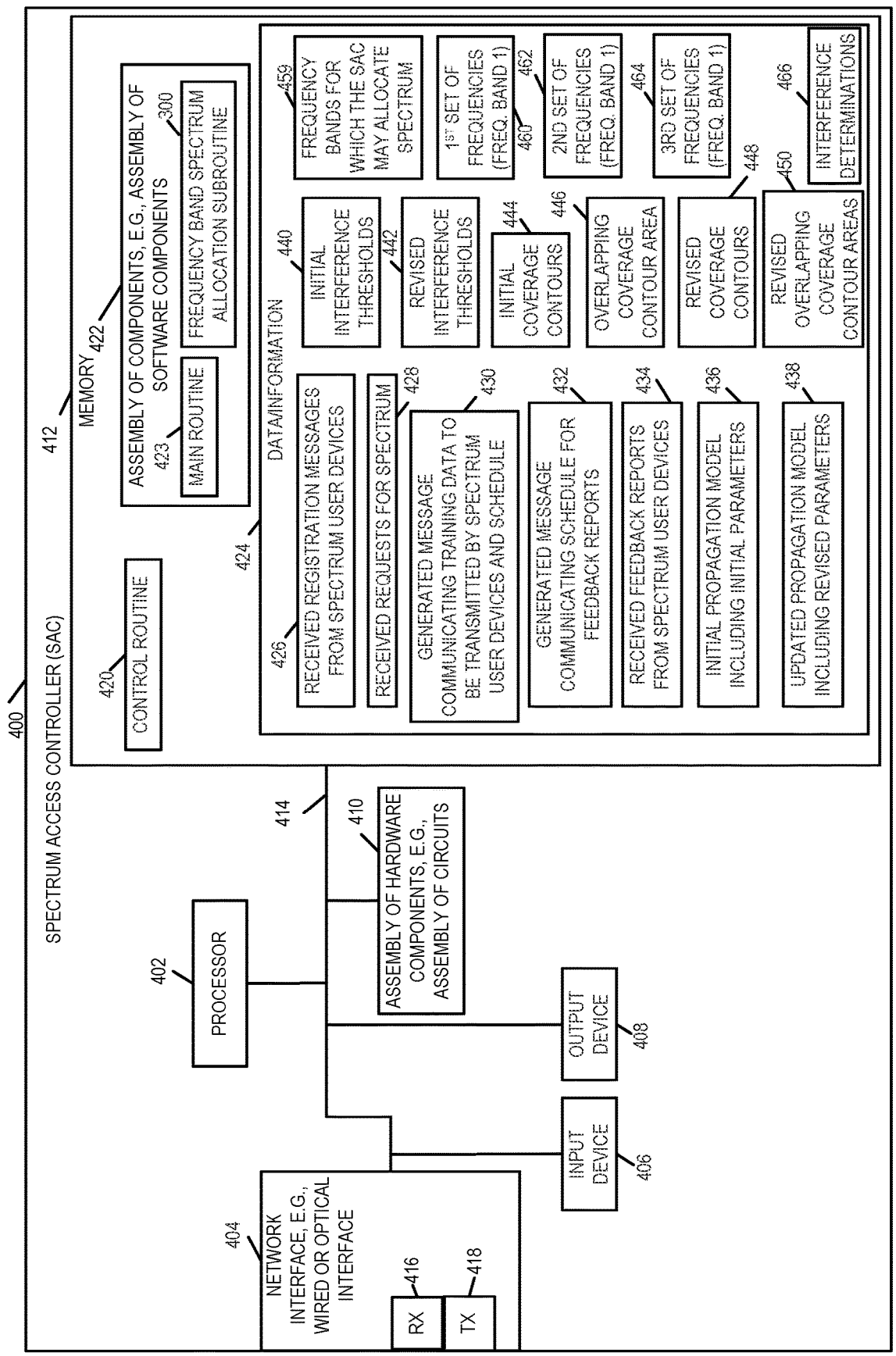
FIG. 4 is a drawing of an exemplary spectrum access controller (SAC) in accordance with an exemplary embodiment.

FIG. 4 is a drawing of an exemplary spectrum access controller (SAC) 400 in accordance with an exemplary embodiment. SAC 400 is, e.g., SAC 102 of system 100 of FIG. 1 and/or a SAC implementing steps of the exemplary method of flowchart 200 of FIG. 2 and/or flowchart 300 of FIG. 3.

SAC 400 includes a processor 402, e.g., a CPU, a network interface 404, an input device 406, e.g., a keyboard, an output device 408, e.g., a display, an assembly of hardware components 410, e.g., an assembly of circuits, and memory 412 coupled together via a bus 414 over which the various elements may interchange data and information.

Network interface 404, a wired or optical interface, couples the SAC 400 to other communications devices, e.g., spectrum user devices, via a communications network and/or the Internet. Network interface includes a receiver 416, via which the SAC receives signals from other devices and transmitter 418 via which the SAC sends signals to other devices. Exemplary signals received via receiver 418 include registration request messages from spectrum user devices, e.g., including spectrum user device ID, spectrum user device location and/or spectrum user device transmission power level, spectrum request messages from spectrum user devices, and feedback reports from spectrum user devices, e.g., feedback reports including, e.g., measurement device location information, received signal strength information (e.g., reference signal received power (RSRP) information), received signal quality information (e.g., a SNR), and/or interference information. In some embodiments, the feedback report includes a composite of information collected by various end user devices (UEs) being serviced by the spectrum user device and information directly measured by the spectrum user device. In some embodiments, the feedback report includes measurements of training signals transmitted by other spectrum user devices. Exemplary signals sent by transmitter 418 include registration response messages to spectrum user devices, spectrum allocation signals to spectrum user devices (e.g., specifying a particular frequency band and a set of frequencies in the band which are being allocated to the spectrum user device to use), signals specifying training signals to be transmitted by spectrum users devices, signals conveying a schedule for transmission of training signals by the spectrum user devices, and signals conveying a scheduling for spectrum user devices to transmit feedback reports.

Memory 412 includes a control routine 420, e.g., for controlling basic functions of the SAC, e.g., boot up, memory access, software loading in the processor, interface control, etc., an assembly of components 422, e.g., an assembly of software components 422 including, e.g., routines, sub-routines, software modules and/or applications. Assembly of components 422 includes a main routine, e.g., software for implementing steps of flowchart 200 of FIG. 2 which are performed by a SAC, and a frequency band spectrum allocation subroutine 300, e.g., for implementing steps of the flowchart of FIG. 3. Memory 412 further includes data/information 424. Data information 424 includes received registration request messages from spectrum user devices 426, received requests for spectrum from spectrum user devices 428, and a generated message communicating training data to be transmitted by spectrum user devices and a corresponding transmission schedule. Different spectrum user devices in a frequency band are scheduled, by the SAC 400, to transmit specified training signals at different times in the schedule (e.g., a recurring schedule), and the other spectrum user devices (which are not transmitting) are to monitor for, detect and measure the training signals. In some embodiments, UE devices are also to monitor for, detect and measure the training signals, and report the results to a spectrum user device to which it is attached. Data/information 424 further includes a generated message to be sent to a spectrum user device communicating a schedule for sending feedback reports to the SAC 432, received feedback reports from spectrum user devices 434, an initial propagation model including a set of initial parameters 436, and an updated propagation model including at least some revised parameters (e.g., based on the feedback reports). Exemplary propagation model parameters which are updated include, e.g., reliability factors, confidence factors and clutter density. In some embodiments the SAC 400 uses (e.g., maintains and updates) different propagation models corresponding to at least some different spectrum user devices and/or different frequency bands. Data/information 424 further includes initial interference thresholds 440, revised interference thresholds, information identifying initial coverage contours 444 corresponding the spectrum user device, information identifying overlapping coverage contours corresponding to two or more spectrum user devices, information identifying revised coverage contours, e.g., based on feedback reports, information identifying revised overlapping coverage contour areas, and interference determination 466. Data/information 424 further includes information identifying frequency bands for which the SAC may allocate spectrum 459 (e.g., information specifying a first frequency band, a second frequency band and third frequency band), information identifying a 1st set of frequencies in a 1st frequency band 460, information identifying a set of frequencies in the 1st frequency band 462, and information identifying a 3rd set of frequencies in the 1st frequency band.

Figure 5:
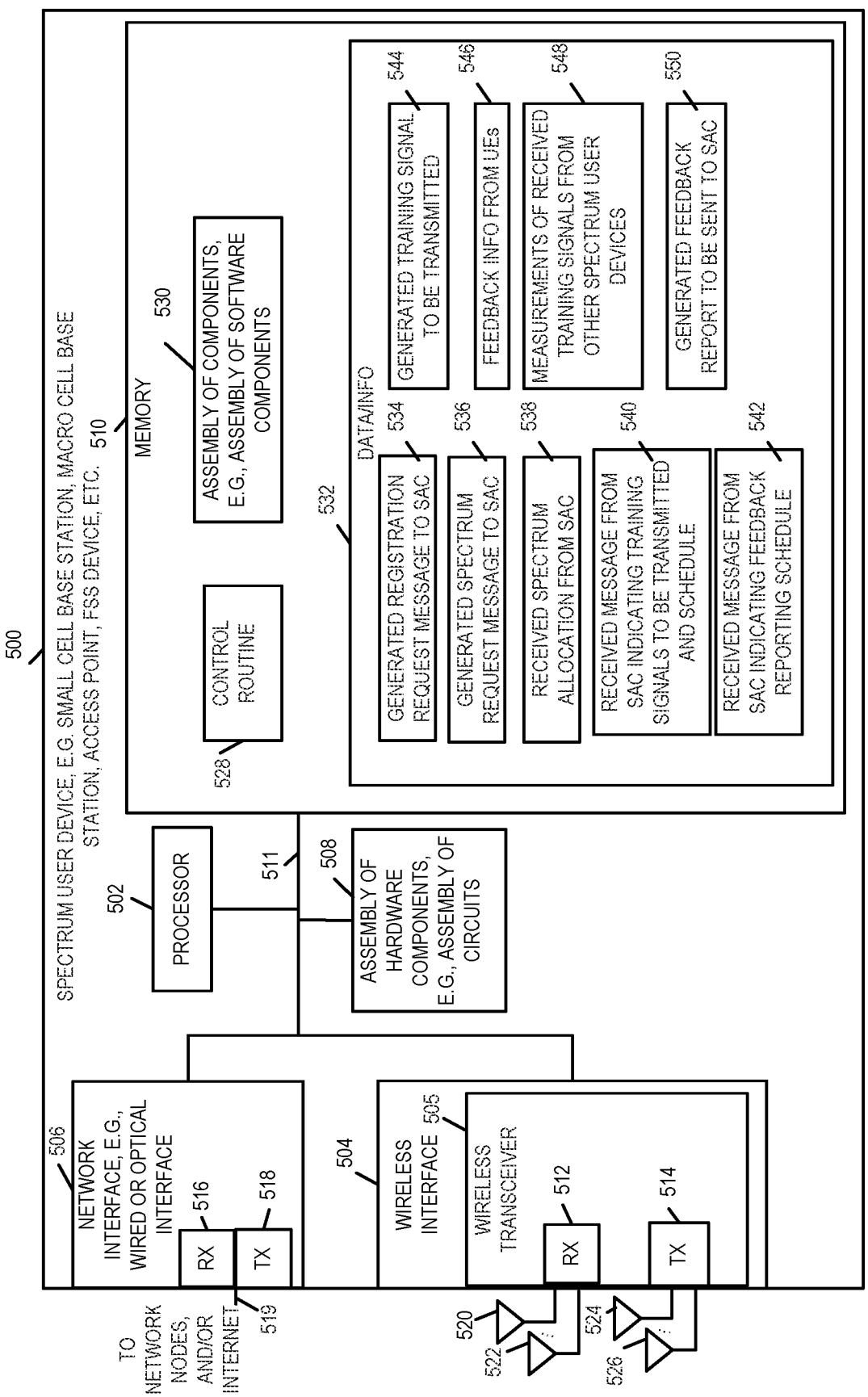
FIG. 5 is a drawing of an exemplary spectrum user device in accordance with an exemplary embodiment.

FIG. 5 is a drawing of an exemplary spectrum user device 500 in accordance with an exemplary embodiment. Exemplary spectrum user device 500 is, e.g., any of the spectrum user devices (104, 106, 108, . . . , 110) of system 100 of FIG. 1, and/or a spectrum user device implementing steps of the method of flowchart 200 of FIG. 2. Spectrum user device 500 is, e.g., a small cell base station, a macro cell base station, an access point (e.g., WiFi AP, IoT AP, LoRa AP, etc.), a FSS device, or another type of device which uses spectrum, e.g., providing wireless access to a plurality of user end devices, e.g., UEs, being served by the spectrum user device.

Spectrum user device 500 includes a processor 502, e.g., a CPU, wireless interface 504, a network interface 506, an assembly of hardware components 508, e.g., an assembly of circuits, and memory 510, coupled together via a bus 511 over which the various elements may interchange data and information. Wireless interface 504 includes a wireless receiver 512 coupled to one or more receive antennas or antenna elements (520, . . . , 522) via which the spectrum user device 500 may receive wireless signals from UE devices, and a wireless transmitter 514 coupled to one or transmit antenna or antenna elements (524, . . . , 526) via which the spectrum user device 500 may transmit wireless signals to UE devices. Wireless signals transmitted by wireless transmitter 514 includes training signals in accordance with instructions from a SAC, control signals to UEs, and downlink traffic data signals to UEs. Wireless signals received by wireless receiver 512 include, e.g., uplink traffic data signals from UEs, control data from UEs, and feedback reports from UEs. In some embodiments, the wireless receiver 512 and wireless transmitter 514 are included as part of a wireless transceiver, e.g., a wireless transceiver chip. Network interface 506, e.g., a wired or optical interface, includes a receiver 516, a transmitter 518, and a connector 519 coupled to the receiver 516 and transmitter 518. Network interface 506 via connector 519 couples the spectrum user device to network nodes, e.g., a SAC device, and/or the Internet. Exemplary signals transmitted via transmitter 518 include a registration request to a SAC, a request for spectrum to the SAC, and feedback reports, including, e.g., measurement device location information, signal strength measurement information, signal quality measurement information, and/or signals interference measurement information. Exemplary signals received via receiver 516 includes a registration response message (registration accept message) from a SAC, a spectrum allocation message from the SAC in response to a previously transmitted spectrum request, instructions from a SAC for transmitting training signals in accordance with a SAC defined schedule, and instructions, including a schedule, from the SAC for reporting feedback reports to the SAC.

Memory 510 includes a control routine 528, an assembly of components 530, and data/information 532. The control routine 528 includes code for controlling basic functions of the SAC, e.g., boot up, memory access, software loading in the processor, interface control, etc. The assembly of components 530, e.g., an assembly of software components, includes, e.g., routines, sub-routines, software modules and/or applications. Assembly of components 530 includes software for implementing steps of flowchart 200 of FIG. 2 which are performed by a spectrum user device. Data/information 532 includes a generated registration request message to be sent to a SAC 534, a generated spectrum request message to be sent to the SAC 536, a received spectrum allocation from a SAC 538, received messaged from SAC indicating training signals to be transmitted and a schedule for transmission 540, a received message from SAC indicating a feedback reporting schedule 542, a generated training signal to be wirelessly transmitted by the spectrum user device 544, feedback information from UEs 546, measurements (performed by spectrum user device 500) of received training signals from other spectrum user devices 548, and a generated feedback report to be sent to SAC 550. In some embodiments the generated feedback report to be sent to the SAC 550 includes an aggregation of data including measurement performed by a plurality of UEs being serviced by spectrum user device 500 and measurements performed directly by spectrum user device 500.

Figure 6:
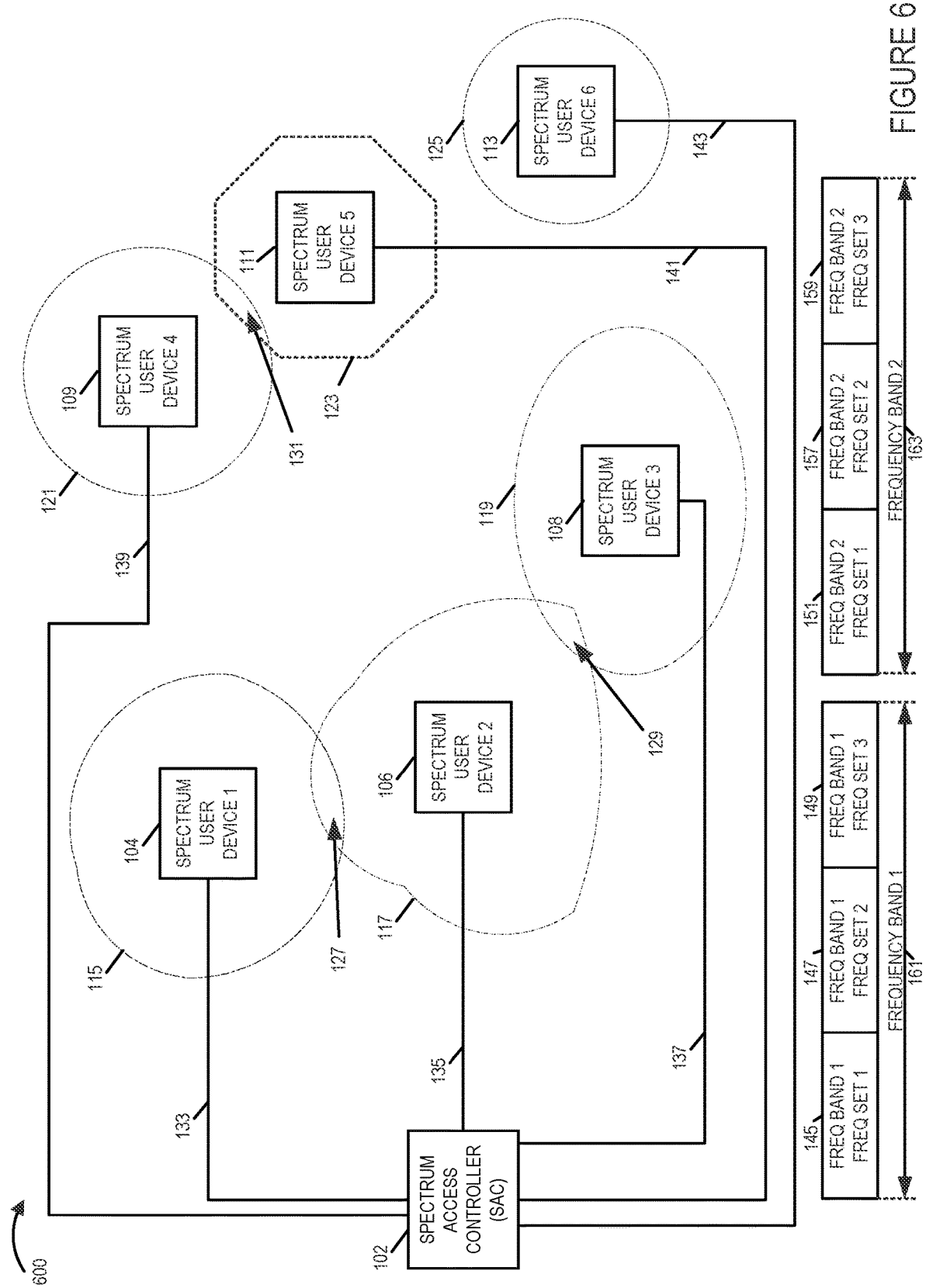
FIG. 6 is a drawing illustrating an exemplary communications system including a SAC and a plurality of spectrum user devices, e.g., base stations or other access point devices which may correspond to different mobile network operators, and further illustrating exemplary estimated coverage contours, estimated overlapping coverage contour areas, and exemplary spectrum bands including exemplary frequency sets, which may be allocated by the SAC, in accordance with an exemplary embodiment.

FIG. 6 is a drawing illustrating an exemplary communications system 600 including a SAC 102 and a plurality of spectrum user devices, e.g., base stations or other access point devices which may correspond to different mobile network operators, and further illustrating exemplary estimated coverage contours, estimated overlapping coverage contour areas, and exemplary spectrum bands including exemplary frequency sets, which may be allocated by the SAC, in accordance with an exemplary embodiment. The plurality of spectrum user devices includes spectrum user device 1 104, spectrum user device 2 106, spectrum user device 3 108, spectrum user device 4 109, spectrum user device 5 111, and spectrum user device 6 113. The spectrum user devices (104, 106, 108, 109, 111, 113) are coupled to SAC 102 via communications links (133, 135, 137, 139, 141, 143) respectively, via which control information including, e.g., spectrum allocations, instructions for transmitting training signals, transmission schedules and feedback reporting schedules are sent to the spectrum user devices and data feedback reports, e.g. including signal strength information, signal quality information, device location information, usage information, and interference information, are sent to the SAC 102.

The SAC 102 estimates coverage contours corresponding to the spectrum user devices based on propagation models including propagation models parameters, locations of the devices, and transmission power information. Dashed line 115 is used to represent an SAC estimated coverage contour corresponding to spectrum user device 1 104. Dashed/dotted line 117 is used to represent the SAC estimated coverage contour corresponding to spectrum user device 2 106. Dashed/double dotted line 119 is used to represent the SAC estimated coverage contour corresponding to spectrum user device 3 108. Dashed line 121 is used to represent the SAC estimated coverage contour corresponding to spectrum user device 4 109. Dashed line 123 is used to represent the SAC estimated coverage contour corresponding to spectrum user device 5 111. Dashed line 125 is used to represent the SAC estimated coverage contour corresponding to spectrum user device 6 113.

Area 127 is an SAC estimated overlapping coverage contour area, with regard to estimated coverage contour 115 and coverage contour 117. Area 129 is another SAC estimated overlapping coverage contour area, with regard to estimated coverage contour 117 and coverage contour 119. Area 131 is another SAC estimated overlapping coverage contour area, with regard to estimated coverage contour 121 and coverage contour 123.

In this example the SAC 102 may allocate spectrum from frequency band 1 161 and/or frequency band 2 163 to the registered spectrum user devices. Spectrum band 1 161 includes a first frequency set 145, a second frequency set 147 and a third frequency set 149. Spectrum band 2 163 includes a first frequency set 151, a second frequency set 157 and a third frequency set 159.

Spectrum user device 6 113, which has a coverage contour 125 which does not overlap with any of the coverage contours of the other spectrum user devices, may be allocated any or all of the frequency sets in frequency band 1 161 and frequency band 2.

Allocation of frequencies to the other spectrum user devices (104, 106, 108, 109, and 111) is dependent upon SAC interference determinations, e.g., within the overlapping coverage areas. For example, if the SAC estimated interference in overlapping coverage area 131 is determined to be below a maximum threshold for both spectrum user device 4 109 and spectrum user device 5 111, then both spectrum user device 4 and spectrum user device 5 may be allocated any of the frequency sets in either of the two bands. (The same spectrum can be reused by both devices.) However, if the SAC estimated interference in overlapping coverage area 131 is determined to be above a maximum threshold for both spectrum user device 4 109 and spectrum user device 5 111, spectrum user device 4 109 and spectrum user device 5 111 should be allocated different non-overlapping sets of spectrum. For example, spectrum user device 4 is allocated frequency set 1 of frequency band 1 145, while spectrum user device 5 is allocated frequency set 2 of frequency band 1 147. (The same spectrum cannot be re-used by the two devices in this example because of an unacceptable level of interference.)

In some embodiments, interference thresholds, which are used by the SAC 102 in making spectrum allocation decisions are updated, e.g., refined or fine tuned, based on the received data feedback from the spectrum user devices. In some embodiments, propagation model parameters, e.g., confidence factors, reliability factors, clutter density, updated, e.g., refined or fine tuned, based on the received data feedback from the spectrum user devices. The refined propagation models are used to generate better representations of the actual contour coverage areas.

Various aspects and/or features of some embodiments of the present invention are further described below. In some embodiments of the present invention, the protection or coexistence thresholds used by a spectrum access controller (SAC) are adapted based on device (spectrum user device) or user (end user device) feedback. In some embodiments, the SAC allocates spectrum to be used by devices in a tiered use band based on priorities. In some embodiments, propagations models are used along with device protection or coexistence thresholds to determine frequency allocation. In various embodiments, the thresholds are adapted based on data derived from device (spectrum user device) and user (end user device) feedback in form of statistical reporting, such as signal strength and quality. In various embodiments, band frequencies are assigned to devices to maximize spectrum use efficiency while avoiding mutual interference.

In some embodiments, whether two or more user devices (spectrum user devices) may reuse the same frequency in the band is determined by comparing the overlap of their coverage contours to a threshold. If the overlap is less than the threshold, then they may reuse the same frequency, increasing spectrum use efficiency; otherwise, they are allocated different frequencies to avoid mutual interference.

In various embodiments, data derived from device (spectrum user device)/user (end user device) feedback is used to adapt the threshold. In the case of feedback indicating lack of interference and/or low channel bandwidth, the threshold may be loosened to increase spectrum sharing. In the case of feedback indicating presence of interference while utilizing high channel bandwidth, the threshold may be tightened to reduce interference.

Data may, and sometimes does, indicate one or more of: signal strength, signal quality, interference, outage, channel bandwidth, latency, throughput, etc. Data may be, and sometimes is collected from multiple devices and aggregated/averaged over time. Data may be region/area dependent.

In some embodiments of the present invention, device (spectrum user device) and/or user (end user device) feedback is used to adapt some parameters in the propagation models used by the SAC. For instance, ITM model confidence and reliability factors may be adapted or clutter density may be adapted, etc.

In some embodiments of the present invention, data collected from devices may be trained by employing training signals. For instance, SAC schedules training signals to be transmitted by each of the devices (spectrum user devices) sharing the band at specific time and periodically, and schedules reporting measurements of signal strength and quality.

In some embodiments of the present invention, data collected in one band may be used for sharing in a different band. For instance, propagation model parameters are adapted based on data collected in an adjacent band (since propagation model parameters are similar in adjacent bands.)

Numbered List of Exemplary Method Embodiments

Method Embodiment 1. A method of operating a spectrum access controller (SAC), the method comprising: estimating (208) coverage contours corresponding to spectrum user devices (e.g., cellular base stations, small cell base stations, CBRS devices, FSS devices, and/or other devices which can operate as access points) requesting spectrum allocations based on a propagation model (e.g., RF propagation model) and spectrum user device expected transmission power levels; allocating (312) a first set of frequencies (e.g., all or a portion of the frequencies in a first frequency band) to spectrum user devices which can share the first set of frequencies; receiving (234) spectrum user device feedback information (e.g., interference information and/or training signal measurement information) from one or more spectrum user devices; and updating (242) one or more parameters (e.g., a confidence factor, a reliability factor, or a clutter density) used in said propagation model based on the received spectrum user device feedback information.

Method Embodiment 2. The method of Method Embodiment 1, further comprising, prior to allocating said first set of frequencies, performing the steps of determining (210) overlapping coverage contour areas based on the estimated coverage contours.

Method Embodiment 3. (overlap of coverage contours case with threshold) The method of Method Embodiment 2, further comprising: comparing (358) coverage contour area overlaps of one or more pairs of spectrum user devices to a first coverage contour overlap threshold (e.g., a threshold corresponding to a 10 percent overlap of contours of spectrum user devices in a pair of spectrum user devices or a fixed size threshold, e.g., an overlap area of a predetermined size); and identifying (360) a first set of spectrum user devices which can share the first set of frequencies in the first frequency band as devices which have coverage contour area overlaps which do not exceed said first coverage contour overlap threshold, said spectrum user devices which can share the first set of frequencies being said first set of spectrum user devices or a subset (e.g., a set including less than all of the first set of user devices) of said first set of spectrum user devices.

Method Embodiment 4. (point protection) The method of Method Embodiment 1, further comprising: estimating (368) interference from one spectrum user device to another spectrum user device in a first pair of spectrum user devices; comparing (370) the estimated interference to a point interference threshold (e.g., a predetermined interference level threshold over which interference is unacceptable from a spectrum sharing perspective); and identifying (372), in response to said comparing determining that the estimated interference is below the point interference threshold, the spectrum user devices in the first pair of user devices as spectrum user devices which can share the first set of frequencies.

Method Embodiment 5. (aggregate protection) The method of Method Embodiment 1, further comprising: estimating (378) multi-device interference from all spectrum user devices in the vicinity (e.g., coverage area, coverage area contour, or predetermined distance) of one spectrum user device (e.g., a first spectrum user device); comparing (380) the estimated multi-device interference to a multi-device interference threshold (e.g., a predetermined interference level threshold over which interference is unacceptable from a multi-device spectrum sharing perspective); and identifying (382), in response to said comparing determining that the estimated multi-device interference is below the multi-device interference level threshold, the spectrum user devices in vicinity of the one spectrum user device along with the one spectrum user device as spectrum user devices which can share the first set of frequencies in the first frequency band.

Method Embodiment 6. The method of Method Embodiment 2, further comprising: estimating (304) interference in determined overlapping coverage contour areas; and identifying (306) a first set of spectrum user devices which can share the first set of frequencies in a first frequency band based on the estimates of interference in the overlapping coverage contour areas, said spectrum user devices which can share the first set of frequencies being said first set of spectrum user devices or a subset (e.g., a set including less than all of the first set of user devices) of said first set of spectrum user devices.

Method Embodiment 6A. The method of Method Embodiment 1, wherein the spectrum user devices correspond to different operators, e.g., different MNO and/or different MVNO operators.

Method Embodiment 6B. The method of Method Embodiment 6A, wherein the spectrum user devices include devices of different types (e.g., devices using different technologies, e.g., 5G wireless cellular, WiFi, LoRa, IoT, etc., and/or different communications protocols) and/or devices having different coverage ranges.

Method Embodiment 6C. The method of Method Embodiment 1, wherein estimating coverage contours is based on a propagation model (e.g., a propagation model based on initial parameters (e.g., initial parameters including initial confidence factors, initial reliability factors, an initial clutter density)).

Method Embodiment 6D. The method of Method Embodiment 2, wherein updating (242) one or more parameters used in said propagation model includes modifying a parameter (e.g., a confidence factor, a reliability factor, or a clutter density) to increase the propagation range predicted by the model when reported interference in a first coverage area exceeds an estimated amount of interference in the first coverage area.

Method Embodiment 6E. The method of Method Embodiment 2, wherein updating (242) one or more parameters used in said propagation model includes modifying a parameter (e.g., a confidence factor, a reliability factor, or a clutter density) to decrease the propagation range predicted by the propagation model when reported interference in a first coverage area is below an estimated amount of interference in the first coverage area.

Method Embodiment 7. The method of Method Embodiment 2, further comprising: estimating (246) revised coverage contours corresponding to spectrum user devices requesting spectrum allocations based on a propagation model using the one or more updated propagation model parameters; determining (248) revised overlapping coverage contour areas based on the estimated revised coverage contours; estimating (304) (second iteration) interference in determined revised overlapping coverage contour areas; identifying (306) (second iteration) a second set of spectrum user devices which can share the first set of frequencies in the first frequency band based on the estimates of interference in the revised overlapping coverage contour areas; and allocating (312) (second iteration) the first set of frequencies (e.g., all or a portion of the frequencies in the first frequency band) to the spectrum user devices in the second set of spectrum user devices which can share the set of frequencies.

Method Embodiment 8. The method of Method Embodiment 6, wherein identifying (306) the first set of spectrum user devices which can share the first set of frequencies in the first frequency band based on the estimates of interference in the overlapping coverage contour areas includes: comparing (308) an estimated (e.g., expected) interference level to an interference threshold.

Method Embodiment 9. The method of Method Embodiment 8, further comprising: modifying (240) the interference threshold (e.g., maximum interference threshold) based on received interference feedback information to generate an updated interference threshold.

Method Embodiment 9A. The method of Method Embodiment 9, wherein modifying (240) the interference threshold includes increasing the interference threshold (thereby increasing the amount of spectrum reuse which will be permitted) when received interference information indicates that the spectrum user devices are not suffering from interference.

Method Embodiment 9B. The method of Method Embodiment 9, wherein modifying (240) the interference threshold includes decreasing the interference threshold (thereby decreasing the amount of spectrum reuse which will be permitted) when received interference information indicates that one or more spectrum user devices are suffering from an unacceptable amount of interference.

Method Embodiment 10. The method of Method Embodiment 9, further comprising: estimating (246) (second iteration) revised coverage contours corresponding to spectrum user devices requesting spectrum allocations based on a propagation model using the one or more updated propagation model parameters; determining (248) (second iteration) revised overlapping coverage contour areas based on the estimated revised coverage contours; estimating (304) (second iteration) interference in determined revised overlapping contour areas; identifying (306) (second iteration), based on at least the updated interference threshold, a second set of spectrum user devices which can share the first set of frequencies in the first frequency band based on the estimates of interference in the revised overlapping counter areas; and allocating (312) (second iteration) the first set of frequencies (e.g., all or a portion of the frequencies in the first frequency band) to the spectrum user devices in the second set of spectrum user devices which can share the set of frequencies.

Method Embodiment 11. The method of Method Embodiment 7, wherein the received spectrum user device feedback information (e.g., received in step 234) corresponds to the first frequency band, the method further comprising: updating (2442) a propagation parameter used for estimating coverage contours in a second frequency band which is different from the first frequency band, said updating based on feedback information corresponding to the first frequency band; and making (250) (when used for the second frequency band) a spectrum allocation corresponding to the second frequency band based on coverage area predictions made using the propagation parameter updated based on the feedback information corresponding to the first frequency band.

Method Embodiment 12. The method of Method Embodiment 11, further comprising: updating (2402) a second interference threshold based on interference feedback information corresponding to the first frequency band; and wherein the updated second interference threshold is used in making the second frequency band spectrum allocation.

Method Embodiment 13. The method of Method Embodiment 1, further comprising: scheduling (2161) training signal transmissions to be made by spectrum user devices (e.g., registered spectrum user devices); and communicating (2181) training schedule transmission information to spectrum user devices.

Method Embodiment 13A. The method of Method Embodiment 13, further comprising: scheduling (2162) feedback reporting to be implemented by spectrum user devices (e.g., registered spectrum user devices); and communicating (2182) feedback reporting schedule information to spectrum user devices.

Method Embodiment 13B. The method of Method Embodiment 13A, further comprising: monitoring (231) for feedback information from spectrum user devices based on the feedback reporting schedule.

Numbered List of Exemplary Apparatus Embodiments

Apparatus Embodiment 1. A spectrum access controller (SAC) (102 or 400) comprising: a receiver (416); and a processor (402) configured to: estimate (208) coverage contours corresponding to spectrum user devices (e.g., cellular base stations, small cell base stations, CBRS devices, FSS devices, and/or other devices which can operate as access points) (104, 106, 108, 110) requesting spectrum allocations based on a propagation model (e.g., RF propagation model) and spectrum user device expected transmission power levels; allocate (312) a first set of frequencies (e.g., all or a portion of the frequencies in a first frequency band) to spectrum user devices which can share the first set of frequencies; operate the SAC to receive (234) (via receiver 416) spectrum user device feedback information (e.g., interference information and/or training signal measurement information) from one or more spectrum user devices; and update (242) one or more parameters (e.g., a confidence factor, a reliability factor, or a clutter density) used in said propagation model based on the received spectrum user device feedback information.

Apparatus Embodiment 2. The SAC of Apparatus Embodiment 1, wherein said wherein said processor (402) is further configured to: determine (210) overlapping coverage contour areas based on the estimated coverage contours.

Apparatus Embodiment 3. (overlap of coverage contours case with threshold) The SAC of Apparatus Embodiment 2, wherein said processor (402) is further configured to: compare (358) coverage contour area overlaps of one or more pairs of spectrum user devices to a first coverage contour overlap threshold (e.g., a threshold corresponding to a 10 percent overlap of contours of spectrum user devices in a pair of spectrum user devices or a fixed size threshold, e.g., an overlap area of a predetermined size); and identify (360) a first set of spectrum user devices which can share the first set of frequencies in the first frequency band as devices which have coverage contour area overlaps which do not exceed said first coverage contour overlap threshold, said spectrum user devices which can share the first set of frequencies being said first set of spectrum user devices or a subset (e.g., a set including less than all of the first set of user devices) of said first set of spectrum user devices.

Apparatus Embodiment 4. (point protection) The SAC of Apparatus Embodiment 1, wherein said processor (402) is further configured to: estimate (368) interference from one spectrum user device to another spectrum user device in a first pair of spectrum user devices; compare (370) the estimated interference to a point interference threshold (e.g., a predetermined interference level threshold over which interference is unacceptable from a spectrum sharing perspective); and identify (372), in response to said comparing determining that the estimated interference is below the point interference threshold, the spectrum user devices in the first pair of user devices as spectrum user devices which can share the first set of frequencies.

Apparatus Embodiment 5. (aggregate protection) The SAC of Apparatus Embodiment 1, wherein said processor (402) is further configured to: estimate (378) multi-device interference from all spectrum user devices in the vicinity (e.g., coverage area, coverage area contour, or predetermined distance) of one spectrum user device (e.g., a first spectrum user device); compare (380) the estimated multi-device interference to a multi-device interference threshold (e.g., a predetermined interference level threshold over which interference is unacceptable from a multi-device spectrum sharing perspective); and identify (382), in response to said comparing determining that the estimated multi-device interference is below the multi-device interference level threshold, the spectrum user devices in vicinity of the one spectrum user device along with the one spectrum user device as spectrum user devices which can share the first set of frequencies in the first frequency band.

Apparatus Embodiment 6. The SAC of Apparatus Embodiment 2, wherein said processor (402) is further configured to: estimate (304) interference in determined overlapping coverage contour areas; and identify (306) a first set of spectrum user devices which can share the first set of frequencies in a first frequency band based on the estimates of interference in the overlapping coverage contour areas, said spectrum user devices which can share the first set of frequencies being said first set of spectrum user devices or a subset (e.g., a set including less than all of the first set of user devices) of said first set of spectrum user devices.

Apparatus Embodiment 6A. The SAC of Apparatus Embodiment 1, wherein the spectrum user devices correspond to different operators, e.g., different MNO and/or different MVNO operators.

Apparatus Embodiment 6B. The SAC of Apparatus Embodiment 6A, wherein the spectrum user devices include devices of different types (e.g., devices using different technologies, e.g., 5G wireless cellular, WiFi, LoRa, IoT, etc., and/or different communications protocols) and/or devices having different coverage ranges.

Apparatus Embodiment 6C. The SAC of Apparatus Embodiment 1, wherein estimating coverage contours is based on a propagation model (e.g., a propagation model based on initial parameters (e.g., initial parameters including initial confidence factors, initial reliability factors, an initial clutter density)).

Apparatus Embodiment 6D. The SAC of Apparatus Embodiment 2, wherein said processor (402) is configured to: modify a parameter (e.g., a confidence factor, a reliability factor, or a clutter density) to increase the propagation range predicted by the model when reported interference in a first coverage area exceeds an estimated amount of interference in the first coverage area, as part of being configured to update (242) one or more parameters used in said propagation model.

Apparatus Embodiment 6E. The SAC of Apparatus Embodiment 2, wherein said processor (402) is configured to: modify a parameter (e.g., a confidence factor, a reliability factor, or a clutter density) to decrease the propagation range predicted by the propagation model when reported interference in a first coverage area is below an estimated amount of interference in the first coverage area, as part of being configured to update (242) one or more parameters used in said propagation model.

Apparatus Embodiment 7. The SAC of Apparatus Embodiment 2, wherein said processor (402) is further configured to: estimate (246) revised coverage contours corresponding to spectrum user devices requesting spectrum allocations based on a propagation model using the one or more updated propagation model parameters; determine (248) revised overlapping coverage contour areas based on the estimated revised coverage contours; estimate (304) (second iteration) interference in determined revised overlapping coverage contour areas; identify (306) (second iteration) a second set of spectrum user devices which can share the first set of frequencies in the first frequency band based on the estimates of interference in the revised overlapping coverage contour areas; and allocate (312) (second iteration) the first set of frequencies (e.g., all or a portion of the frequencies in the first frequency band) to the spectrum user devices in the second set of spectrum user devices which can share the set of frequencies.

Apparatus Embodiment 8. The SAC of Apparatus Embodiment 6, wherein said processor (402) is configured to: compare (308) an estimated (e.g., expected) interference level to an interference threshold, as part of being configured to identify (306) the first set of spectrum user devices which can share the first set of frequencies in the first frequency band based on the estimates of interference in the overlapping coverage contour areas.

Apparatus Embodiment 9. The SAC of Apparatus Embodiment 8, wherein said processor (402) is further configured to: modify (240) the interference threshold (e.g., maximum interference threshold) based on received interference feedback information to generate an updated interference threshold.

Apparatus Embodiment 9A. The SAC of Apparatus Embodiment 9, wherein said processor (402) is configured to increase the interference threshold (thereby increasing the amount of spectrum reuse which will be permitted) when received interference information indicates that the spectrum user devices are not suffering from interference, as part of being configured to modify (240) the interference threshold.

Apparatus Embodiment 9B. The SAC of Apparatus Embodiment 9, wherein said processor (402) is configured to decreasing the interference threshold (thereby decreasing the amount of spectrum reuse which will be permitted) when received interference information indicates that one or more spectrum user devices are suffering from an unacceptable amount of interference, as part of being configured to modify (240) the interference threshold.

Apparatus Embodiment 10. The SAC of Apparatus Embodiment 9, wherein said processor (402) is further configured to: estimate (246) (second iteration) revised coverage contours corresponding to spectrum user devices requesting spectrum allocations based on a propagation model using the one or more updated propagation model parameters; determine (248) (second iteration) revised overlapping coverage contour areas based on the estimated revised coverage contours; estimate (304) (second iteration) interference in determined revised overlapping contour areas; identify (306) (second iteration), based on at least the updated interference threshold, a second set of spectrum user devices which can share the first set of frequencies in the first frequency band based on the estimates of interference in the revised overlapping counter areas; and allocate (312) (second iteration) the first set of frequencies (e.g., all or a portion of the frequencies in the first frequency band) to the spectrum user devices in the second set of spectrum user devices which can share the set of frequencies.

Apparatus Embodiment 11. The SAC of Apparatus Embodiment 7, wherein said processor (402) is further configured to: when the received spectrum user device feedback information (e.g., received in step 234) corresponds to the first frequency band, update (2442) a propagation parameter used for estimating coverage contours in a second frequency band which is different from the first frequency band, said updating based on feedback information corresponding to the first frequency band; and make (250) (when used for the second frequency band) a spectrum allocation corresponding to the second frequency band based on coverage area predictions made using the propagation parameter updated based on the feedback information corresponding to the first frequency band.

Apparatus Embodiment 12. The SAC of Apparatus Embodiment 11, wherein said processor (402) is further configured to: update (2402) a second interference threshold based on interference feedback information corresponding to the first frequency band; and wherein the updated second interference threshold is used in making the second frequency band spectrum allocation.

Apparatus Embodiment 13. The SAC of Apparatus Embodiment 1, further comprising: a transmitter (418); and wherein said processor (402) is further configured to: schedule (2161) training signal transmissions to be made by spectrum user devices (e.g., registered spectrum user devices); and operate the SAC to communicate (2181) (via transmitter 418) training schedule transmission information to spectrum user devices.

Apparatus Embodiment 13A. The SAC of Apparatus Embodiment 13, wherein said processor (402) is further configured to: schedule (2162) feedback reporting to be implemented by spectrum user devices (e.g., registered spectrum user devices); and operate the SAC to communicate (2182) (via transmitter 418) feedback reporting schedule information to spectrum user devices.

Apparatus Embodiment 13B. The SAC of Apparatus Embodiment 13A, wherein said processor (402) is further configured to: operate the SAC to monitor (231) for feedback information from spectrum user devices based on the feedback reporting schedule.

Apparatus Embodiment 14. The SAC of Apparatus Embodiment 1, further comprising: a memory (412) for storing propagation model parameters and interference thresholds.

Numbered List of Exemplary Non-Transitory Computer Readable Medium Embodiments

Non-Transitory Computer Readable Medium Embodiment 1: A non-transitory computer readable medium (412) including machine execute instruction, which when executed by a processor (402) of a spectrum access controller (SAC) (102 or 400) cause the SAC (102 or 400) to perform the steps of: estimating (208) coverage contours corresponding to spectrum user devices (e.g., cellular base stations, small cell base stations, CBRS devices, FSS devices, and/or other devices which can operate as access points) requesting spectrum allocations based on a propagation model (e.g., RF propagation model) and spectrum user device expected transmission power levels; allocating (312) a first set of frequencies (e.g., all or a portion of the frequencies in a first frequency band) to spectrum user devices which can share the first set of frequencies; receiving (234) spectrum user device feedback information (e.g., interference information and/or training signal measurement information) from one or more spectrum user devices; and updating (242) one or more parameters (e.g., a confidence factor, a reliability factor, or a clutter density) used in said propagation model based on the received spectrum user device feedback information.

Various embodiments are directed to apparatus, e.g., spectrum access controllers (SACs), spectrum user devices, end user devices, protected devices, e.g. PAL base stations, interfering devices, e.g. a non-PAL CBSDs (GAA CBSDs), other control devices, UEs, access points, a device including a AMF, a device including a UDM, a device including a SMF, a device including a PCF, a device including a UPF, a server, a device including a N3IWF, a device including a TNGF, base stations, e.g. sector base stations, such as gNB, ng-eNBs, eNBs, etc. supporting beamforming, UEs, base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices.

Various embodiments are also directed to methods, e.g., method of controlling and/or operating a spectrum access controller (SAC), a spectrum user device, and end user device, a protected device, e.g. a PAL base station, an interfering device, e.g. a non-PAL CBSD (GAA CBSD), other control device, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, UEs, a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, an AFC system, cable networks, cloud networks, nodes, servers, cloud service servers, customer premises equipment devices, controllers, network monitoring nodes and/or servers and/or cable or network equipment devices. Various embodiments are directed to communications networks which are partners, e.g., a MVNO network and an MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a spectrum access controller (SAC), a spectrum user device, an end user device, a protected device, e.g. PAL base station, an interfering device, e.g. a non-PAL CBSD (GAA CBSD), other control device, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, a AFC system, etc., said device including a processor configured to implement one, multiple or all of the steps of one or more methods of the invention.

In some embodiments, the processor or processors, e.g., CPUs, of one or more devices, e.g., a spectrum access controllers (SAC), a spectrum user device, an end user device, a protected device, e.g. PAL base station, an interfering device, e.g. a non-PAL CBSD (GAA CBSD), other control device, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a spectrum access controller (SAC), a spectrum user device, an end user device, a protected device, e.g. PAL base station, an interfering device, e.g. a non-PAL CBSD (GAA CBSD), other control device, a UE, an access point, a device including a AMF, a device including a UDM, a device including a SMF, a device including a PCF, a device including a UPF, a server, a device including a N3IWF, a device including a TNGF, a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as a spectrum access controller (SAC), a spectrum user device, an end user device, a protected device, e.g. PAL base station, an interfering device, e.g. a non-PAL CBSD (GAA CBSD), other control device, UE, an access point, a device including a AMF, a device including a UDM, a device including a SMF, a device including a PCF, a device including a UPF, a server, a device including a N3IWF, a device including a TNGF, base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a spectrum access controller (SAC), a spectrum user device, an end user device, a protected device, e.g. PAL base station, an interfering device, e.g. a non-PAL CBSD (GAA CBSD), other control devices, a UE, an access point, a device including a AMF, a device including a UDM, a device including a SMF, a device including a PCF, a device including a UPF, a server, a device including a N3IWF, a device including a TNGF, a base station, e.g., a sector base station, such as gNB, ng-eNB, eNB, etc., supporting beamforming, a UE, a base station supporting massive MIMO such as a CBSD supporting massive MIMO, a network management node or device, a communications device such as a communications nodes such as e.g., a UE, an access point, a device including a AMF, a device including a UDM, a device including a SMF, a device including a PCF, a device including a UPF, a server, a device including a N3IWF, a device including a TNGF, an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a spectrum access controller (SAC), the method comprising:
estimating coverage contours corresponding to spectrum user devices requesting spectrum allocations based on a propagation model and spectrum user device expected transmission power levels;
allocating a first set of frequencies to spectrum user devices which can share the first set of frequencies;
receiving spectrum user device feedback information from one or more spectrum user devices; and
updating one or more parameters used in said propagation model based on the received spectrum user device feedback information.

2. The method of claim 1, further comprising, prior to allocating said first set of frequencies, performing the steps of:
determining overlapping coverage contour areas based on the estimated coverage contours.

3. The method of claim 2, further comprising:
comparing coverage contour area overlaps of one or more pairs of spectrum user devices to a first coverage contour overlap threshold; and
identifying a first set of spectrum user devices which can share the first set of frequencies in a first frequency band as devices which have coverage contour area overlaps which do not exceed said first coverage contour overlap threshold, said spectrum user devices which can share the first set of frequencies being said first set of spectrum user devices or a subset of said first set of spectrum user devices.

4. The method of claim 1, further comprising:
estimating interference from one spectrum user device to another spectrum user device in a first pair of spectrum user devices;
comparing the estimated interference to a point interference threshold; and
identifying, in response to said comparing determining that the estimated interference is below the point interference threshold, the spectrum user devices in the first pair of user devices as spectrum user devices which can share the first set of frequencies.

5. The method of claim 1, further comprising:
estimating multi-device interference from all spectrum user devices in a vicinity of one spectrum user device;
comparing the estimated multi-device interference to a multi-device interference threshold; and
identifying, in response to said comparing determining that the estimated multi-device interference is below the multi-device interference level threshold, the spectrum user devices in vicinity of the one spectrum user device along with the one spectrum user device as spectrum user devices which can share the first set of frequencies in a first frequency band.

6. The method of claim 2, further comprising:
estimating interference in the determined overlapping coverage contour areas; and
identifying a first set of spectrum user devices which can share the first set of frequencies in a first frequency band based on the estimates of interference in the overlapping coverage contour areas.

7. The method of claim 2, further comprising:
estimating revised coverage contours corresponding to spectrum user devices requesting spectrum allocations based on a propagation model using the one or more updated parameters used in said propagation model;
determining revised overlapping coverage contour areas based on the estimated revised coverage contours;
estimating interference in the determined revised overlapping coverage contour areas;
identifying a second set of spectrum user devices which can share the first set of frequencies in the first frequency band based on the estimates of interference in the revised overlapping coverage contour areas; and
allocating the first set of frequencies to the spectrum user devices in the second set of spectrum user devices which can share the first set of frequencies.

8. The method of claim 6, wherein identifying the first set of spectrum user devices which can share the first set of frequencies in the first frequency band based on the estimates of interference in the overlapping coverage contour areas includes:
comparing an estimated interference level to an interference threshold.

9. The method of claim 8, further comprising:
modifying the interference threshold based on received interference feedback information to generate an updated interference threshold.

10. The method of claim 9, further comprising:
estimating revised coverage contours corresponding to spectrum user devices requesting spectrum allocations based on a propagation model using the one or more updated parameters used in said propagation model;
determining revised overlapping coverage contour areas based on the estimated revised coverage contours;
estimating interference in the determined revised overlapping coverage contour areas;
identifying, based on at least the updated interference threshold, a second set of spectrum user devices which can share the first set of frequencies in the first frequency band based on the estimates of interference in the revised overlapping coverage contour areas; and
allocating the first set of frequencies to the spectrum user devices in the second set of spectrum user devices which can share the first set of frequencies.

11. The method of claim 7, wherein the received spectrum user device feedback information corresponds to the first frequency band, the method further comprising:
updating a propagation parameter used for estimating coverage contours in a second frequency band which is different from the first frequency band, said updating based on the feedback information corresponding to the first frequency band; and
making a spectrum allocation corresponding to the second frequency band based on coverage area predictions made using the propagation parameter updated based on the feedback information corresponding to the first frequency band.

12. The method of claim 11, further comprising:
updating a second interference threshold based on interference feedback information corresponding to the first frequency band;
and wherein the updated second interference threshold is used in making the second frequency band spectrum allocation.

13. The method of claim 1, further comprising:
scheduling training signal transmissions to be made by the spectrum user devices; and
communicating training schedule transmission information to the spectrum user devices.

14. A spectrum access controller (SAC) comprising:
a receiver; and
a processor configured to:
- estimate coverage contours corresponding to spectrum user devices requesting spectrum allocations based on a propagation model and spectrum user device expected transmission power levels;
- allocate a first set of frequencies to spectrum user devices which can share the first set of frequencies;
- operate the SAC to receive spectrum user device feedback information from one or more spectrum user devices; and
- update one or more parameters used in said propagation model based on the received spectrum user device feedback information.

15. The SAC of claim 14, wherein said wherein said processor is further configured to: determine overlapping coverage contour areas based on the estimated coverage contours.

16. The SAC of claim 15, wherein said processor is further configured to:
- compare coverage contour area overlaps of one or more pairs of spectrum user devices to a first coverage contour overlap threshold; and
- identify a first set of spectrum user devices which can share the first set of frequencies in a first frequency band as devices which have coverage contour area overlaps which do not exceed said first coverage contour overlap threshold, said spectrum user devices which can share the first set of frequencies being said first set of spectrum user devices or a subset of said first set of spectrum user devices.

17. The SAC of claim 14, wherein said processor is further configured to:
- estimate interference from one spectrum user device to another spectrum user device in a first pair of spectrum user devices;
- compare the estimated interference to a point interference threshold; and
- identify, in response to said comparing determining that the estimated interference is below the point interference threshold, the spectrum user devices in the first pair of user devices as spectrum user devices which can share the first set of frequencies.

18. The SAC of claim 14, wherein said processor is further configured to:
- estimate multi-device interference from all spectrum user devices in a vicinity of one spectrum user device;
- compare the estimated multi-device interference to a multi-device interference threshold; and
- identify, in response to said comparing determining that the estimated multi-device interference is below the multi-device interference level threshold, the spectrum user devices in vicinity of the one spectrum user device along with the one spectrum user device as spectrum user devices which can share the first set of frequencies in a first frequency band.

19. The SAC of claim 15, wherein said processor is further configured to:
- estimate interference in the determined overlapping coverage contour areas; and
- identify a first set of spectrum user devices which can share the first set of frequencies in a first frequency band based on the estimates of interference in the overlapping coverage contour areas.

20. A non-transitory computer readable medium including machine execute instruction, which when executed by a processor of a spectrum access controller (SAC) cause the SAC to perform the steps of:
- estimating coverage contours corresponding to spectrum user devices requesting spectrum allocations based on a propagation model and spectrum user device expected transmission power levels;
- allocating a first set of frequencies to spectrum user devices which can share the first set of frequencies;
- receiving spectrum user device feedback information from one or more spectrum user devices; and
- updating one or more parameters used in said propagation model based on the received spectrum user device feedback information.

* * * * *